US011723422B2

(12) United States Patent
Waterloo

(10) Patent No.: US 11,723,422 B2
(45) Date of Patent: Aug. 15, 2023

(54) 3D PRINTED IMPACT RESISTANT GLOVE

(71) Applicant: HexArmor, Limited Partnership, Grand Rapids, MI (US)

(72) Inventor: Nicholas R. Waterloo, Grand Rapids, MI (US)

(73) Assignee: HexArmor, Limited Partnership, Grand Rapids, MI (US)

( * ) Notice: Subject to any disclaimer, the term of this patent is extended or adjusted under 35 U.S.C. 154(b) by 498 days.

(21) Appl. No.: 16/893,536

(22) Filed: Jun. 5, 2020

(65) Prior Publication Data

US 2020/0390169 A1 Dec. 17, 2020

Related U.S. Application Data

(60) Provisional application No. 62/862,342, filed on Jun. 17, 2019.

(51) Int. Cl.
| | | |
|---|---|---|
| *A41D 19/00* | (2006.01) | |
| *A41D 19/015* | (2006.01) | |
| *B33Y 70/00* | (2020.01) | |
| *B33Y 10/00* | (2015.01) | |
| *B33Y 80/00* | (2015.01) | |

(52) U.S. Cl.
CPC ... *A41D 19/01523* (2013.01); *A41D 19/0006* (2013.01); *A41D 19/0058* (2013.01); *A41D 19/01558* (2013.01); *A41D 19/0082* (2013.01); *B33Y 10/00* (2014.12); *B33Y 70/00* (2014.12); *B33Y 80/00* (2014.12)

(58) Field of Classification Search
CPC .......... A41D 19/0058; A41D 19/01558; A41D 19/0006; B33Y 80/00
See application file for complete search history.

(56) References Cited

U.S. PATENT DOCUMENTS

| | | |
|---|---|---|
| 2,070,506 A | 2/1937 | Bevill |
| D299,564 S | 1/1989 | Pierce, Jr. |
| D306,366 S | 2/1990 | Turpie |
| D315,620 S | 3/1991 | Latina |

(Continued)

FOREIGN PATENT DOCUMENTS

| | | | | |
|---|---|---|---|---|
| JP | 2019018399 A | * | 2/2019 | ........... B29C 64/118 |
| SE | EM 002003426-0001 | | 3/2012 | |
| WO | WO-2022076639 A2 | * | 4/2022 | |

OTHER PUBLICATIONS

Soldier Systems, OR—Outdoor Research Rockfall Glove, Aug. 6, 2011, 2 pages, Accessed via the Internet at http://soldiersystems.net/2011/08/06/or-outdoor-research-rockfall-glove/.

(Continued)

*Primary Examiner* — Tajash D Patel
(74) *Attorney, Agent, or Firm* — Price Heneveld LLP

(57) ABSTRACT

A protective garment includes a base layer formed from a flexible material. A grip layer is disposed on a first side of the base layer. The grip layer has an increased coefficient of friction compared to the base layer. A protective layer is disposed on a second side of the base layer. The protective layer includes a three-dimensional matrix that has a plurality of columns that extend in a first direction and a plurality of rows stacked on the plurality of columns that extend in a second direction. The plurality of rows and the plurality of columns define a plurality of voids.

19 Claims, 22 Drawing Sheets

(56) References Cited

U.S. PATENT DOCUMENTS

| | | |
|---|---|---|
| 6,367,116 B1 | 4/2002 | DeBartolo |
| D464,178 S | 10/2002 | Redwood |
| D475,175 S | 6/2003 | Kopala |
| 6,862,744 B2 | 3/2005 | Kuroda et al. |
| D516,277 S | 3/2006 | Mattesky |
| D601,777 S | 10/2009 | Rolfe |
| D608,978 S | 2/2010 | Votel |
| D609,861 S | 2/2010 | Fitzgerald et al. |
| D619,305 S | 7/2010 | Fitzgerald et al. |
| D640,446 S | 6/2011 | Allen |
| D648,490 S | 11/2011 | Choi et al. |
| D650,532 S | 12/2011 | Choi |
| D651,361 S | 12/2011 | Choi |
| 8,087,101 B2* | 1/2012 | Ferguson ............. A41D 31/285 2/455 |
| D695,968 S | 12/2013 | Ruminski |
| D695,969 S | 12/2013 | Ruminski |
| D703,389 S | 4/2014 | Ruminski |
| D733,364 S | 6/2015 | Choi et al. |
| 9,302,171 B1* | 4/2016 | Iacono ............. A41D 19/01547 |
| D777,385 S | 1/2017 | Urbelis |
| D809,714 S | 2/2018 | Lim |
| D824,599 S | 7/2018 | Lim |
| D824,640 S | 8/2018 | Votel et al. |
| D844,254 S | 3/2019 | Lim |
| 11,455,435 B2* | 9/2022 | Willis ..................... G06T 17/20 |
| 2006/0212990 A1 | 9/2006 | Mattesky |
| 2010/0071114 A1 | 3/2010 | Jaeger |
| 2010/0083420 A1 | 4/2010 | Bouckaert |
| 2011/0088139 A1 | 4/2011 | Travell |
| 2015/0143610 A1* | 5/2015 | Pimentel de Oliveira .................. A41D 19/0058 2/167 |
| 2018/0093446 A1* | 4/2018 | Ogale .................. D04H 1/4374 |
| 2019/0174849 A1* | 6/2019 | Albertson ........ A41D 19/01558 |
| 2021/0094255 A1* | 4/2021 | Benkoski .................. B32B 5/26 |

OTHER PUBLICATIONS

Heavy Duty Work Gloves with Knuckles pads, posted at amazon.com, posting date Jul. 18, 2016, [online], [site visited Apr. 9, 2020] Available from Internet, URL:https:/www.amazon.com/Knuckles-Industrial-Protective-Automotive-Construciton/dp/B01IMWESPO (Year:2016).

Portwest Anti Impact Cut Resistant Glove, posted at amazon.com, posting date Apr. 21, 2019, [online], [site visited Apr. 9, 2020]. Available from Internet, URL:https://www.amazon.com/Portwest-Anti-Impact-Resistant-Glove/dpB07R1WWTG6?th=1 (year: 2019).

* cited by examiner

| 3D Printed TPU | | | | |
|---|---|---|---|---|
| Report # | Modulus (MPa) | Energy to Break (J) | Break Energy per Cubic mm (J/mm³) | % extension-to-break |
| 1 | 23 | 8.1 | 5.90E-02 | 441 |
| 2 | 23.2 | 7.9 | 5.70E-02 | 419 |
| 3 | 23.5 | 8.5 | 6.10E-02 | 445 |
| Mean | 23.2 | 8.2 | 5.90E-02 | 435 |

FIG. 13

| Plastisol | | | | |
|---|---|---|---|---|
| Report # | Modulus (MPa) | Energy to Break (J) | Break Energy per Cubic mm (J/mm³) | % extension-to-break |
| G | 4.3 | 1.16 | 1.86E-03 | 269 |
| L | 4.2 | 0.06 | 6.20E-05 | 123 |
| M | 4.5 | 0.24 | 2.50E-04 | 160 |
| N | 3.6 | 0.15 | 2.45E-04 | 147 |
| Mean | 4.3 | 0.49 | 7.24E-04 | 184 |

FIG. 14

| Moisture Vapor Transmission Rate (MVTR) | | | |
|---|---|---|---|
| | Average mL/Hour | Average mL/cm$^2$/Hour | % Better than Plastisol |
| DSPX3 | -0.19821 | 0.0114244 | 118,000 |
| KNU7 | -0.05446 | 0.0031391 | 32,400 |
| Plastisol | -0.00017 | 0.0000097 | --- |
| Control | 0 | 0 | --- |

FIG. 15

| Transmitted Force (kN) | | | |
|---|---|---|---|
| Thickness (mm) | Plastisol | KNU7 | DSPX3 |
| 7.4 | 4.8 | 0.9 | 2.4 |
| 6.9 | 5.9 | 2.3 | 3.7 |
| 6.6 | 6.5 | 3.0 | 4.4 |
| 6.3 | 7.3 | 4.0 | 5.3 |
| 5.9 | 8.1 | 5.0 | 6.2 |

FIG. 17

| % Reduction in Force Compared to Plastisol | | |
|---|---|---|
| Thickness (mm) | KNU7 (%) | DSPX3 (%) |
| 7.4 | 80.6 | 48.8 |
| 6.9 | 61.1 | 37.0 |
| 6.6 | 53.4 | 32.2 |
| 6.3 | 45.0 | 27.2 |
| 5.9 | 38.1 | 23.0 |

FIG. 18

| Classification of Impact Resistance | | |
|---|---|---|
| Performance Level | Mean (kN) | All Impacts (kN) |
| 1 | $\leq 9$ | $\leq 11.3$ |
| 2 | $\leq 6.5$ | $\leq 8.1$ |
| 3 | $\leq 4$ | $\leq 5$ |

FIG. 19

|  | Thickness (mm) | Transmitted Force (N) | Reduction Factor Compared to Plastisol | ANSI 138 Impact Test |
|---|---|---|---|---|
| Plastisol | 5.9 | 8100 | --- | Level 1 |
| KNU7 | 5.9 | 5000 | 1.6 | Level 2 |
| Plastisol | 6.6 | 6500 | --- | Level 1 |
| KNU7 | 6.6 | 3000 | 2.2 | Level 3 |

FIG. 20

|  | Thickness (mm) | Transmitted Force (N) | Reduction Factor Compared to Plastisol by Thickness | ANSI 138 Impact Test |
|---|---|---|---|---|
| Plastisol | 6.8 | 6700 | --- | Level 1 |
| DSPX3 | 6.8 | 3100 | 2.2 | Level 3 |

FIG. 21

| Newtons per mm Reduction – Plastisol v. KNU7 |||| 
|---|---|---|---|
|  | Thickness (mm) | N/mm Reduction | % Better than Plastisol by Thickness (%) |
| Plastisol | 6.89 | 2037 | --- |
| KNU7 | 6.89 | 2712 | 133 |

FIG. 23

| Newtons per mm Reduction – Plastisol v. DSPX3 |||| 
|---|---|---|---|
|  | Thickness (mm) | N/mm Reduction | % Better than Plastisol of Same Thickness (%) |
| Plastisol | 3.07 | 2656 | --- |
| DSPX3 | 3.07 | 3886 | 146 |
| Plastisol | 4.35 | 2391 | --- |
| DSPX3 | 4.35 | 3739 | 156 |
| Plastisol | 5.47 | 2215 | --- |
| DSPX3 | 5.47 | 3163 | 143 |
| Plastisol | 6.77 | 2051 | --- |
| DSPX3 | 6.77 | 2632 | 128 |
| Plastisol | 7.4 | 1983 | --- |
| DSPX3 | 7.4 | 2443 | 123 |
| Plastisol | 7.87 | 1936 | --- |
| DSPX3 | 7.87 | 2302 | 119 |

FIG. 24

| % Force Reduction — Plastisol v. KNU7 | | | |
|---|---|---|---|
| | Thickness (mm) | % Reduction | % Better than Plastisol by Thickness (%) |
| Plastisol | 6.89 | 67.1 | --- |
| KNU7 | 6.89 | 89.0 | 133 |

FIG. 26

| % Force Reduction — Plastisol v. DSPX3 | | | |
|---|---|---|---|
| | Thickness (mm) | % Reduction | % Better than Plastisol of Same Thickness (%) |
| Plastisol | 3.07 | 30.9 | --- |
| DSPX3 | 3.07 | 56.8 | 184 |
| Plastisol | 4.35 | 46.4 | --- |
| DSPX3 | 4.35 | 77.4 | 167 |
| Plastisol | 5.47 | 56.7 | --- |
| DSPX3 | 5.47 | 82.4 | 145 |
| Plastisol | 6.77 | 66.3 | --- |
| DSPX3 | 6.77 | 84.9 | 128 |
| Plastisol | 7.4 | 70.3 | --- |
| DSPX3 | 7.4 | 88.4 | 126 |
| Plastisol | 7.87 | 73.0 | --- |
| DSPX3 | 7.87 | 86.3 | 118 |

FIG. 27

3D PRINTED IMPACT RESISTANT GLOVE

CROSS-REFERENCE TO RELATED APPLICATIONS

This application claims priority to and the benefit under 35 U.S.C. § 119(e) of U.S. Provisional Patent Application No. 62/862,342, filed on Jun. 17, 2019, entitled "3D PRINTED IMPACT RESISTANT GLOVE," the disclosure of which is hereby incorporated herein by reference in its entirety.

FIELD OF THE DISCLOSURE

The present disclosure generally relates to protective gloves, and more particularly to protective gloves that include at least one printed protective layer, and the method of making the same.

BACKGROUND OF THE DISCLOSURE

Protective gloves are used by workers in various industries to prevent or minimize hand injuries. One popular type of protective glove is a knit glove with a protective layer on a backside, or dorsal side, thereof. Such knit gloves are often combined with a grip layer in and around the palm area, to provide grip and also wear resistance. These gloves may also have a rubbery coating on the palm or other portion of the glove for an enhanced grip and protection. In some instances, these protective gloves are used in high-temperature environments that cause the inside of the glove to become hot and uncomfortable to a wearer due to the lack of air circulation, including within the palm area and dorsal area. Prior attempts to provide air circulation in and around the glove have compromised protection and grip.

The current market consists of gloves with varying durometers of Polyvinyl Chloride (PVC), Thermoplastic Rubber (TPR), Plastisol, and/or foam. These components are typically glued on, sewn on, or are encased in fabric or other structures on the backside of the glove. These materials have limitations in terms of breathability and dexterity. PVC, TPR, and Plastisol are also denser materials and can contribute to hand fatigue.

SUMMARY OF THE DISCLOSURE

According to one aspect of the present disclosure, a protective garment includes a base layer formed from a flexible material. A grip layer is disposed on a first side of the base layer. The grip layer has an increased coefficient of friction compared to the base layer. A protective layer is disposed on a second side of the base layer. The protective layer includes a three-dimensional matrix that has a plurality of columns that extend in a first direction and a plurality of rows stacked on the plurality of columns that extend in a second direction. The plurality of rows and the plurality of columns define a plurality of voids.

According to another aspect of the present disclosure, a protective glove includes a base layer formed from a flexible material. The base layer has an anterior side and a posterior side. A grip layer is disposed on the anterior side of the base layer. The grip layer has an increased coefficient of friction compared to the base layer. A protective layer is disposed on the posterior side of the base layer. The protective layer defines a three-dimensional matrix that includes a plurality of print layers.

According to yet another aspect of the present disclosure, a method of manufacturing a protective glove includes constructing a base layer of a flexible material. A grip layer is attached to a palm area of the base layer. A three-dimensional protective layer is printed for a dorsal region of the base layer. The step of printing includes printing a first pattern onto the base layer and printing a second pattern onto the first pattern, with the second pattern differing from the first pattern.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 13 illustrates a mechanical properties table of printed thermoplastic polyurethane;

FIG. 14 illustrates a mechanical properties table of Plastisol;

FIG. 15 illustrates a moisture vapor transmission rate table;

FIG. 17 illustrates a transmitted force table compared by material thickness;

FIG. 18 illustrates a percentage of reduction in force compared to Plastisol table compared by material thickness;

FIG. 19 illustrates an ANSI 138 classification table of impact resistance;

FIG. 20 illustrates a transmitted force table indicating the corresponding ANSI 138 classification;

FIG. 21 illustrates a transmitted force table indicating the corresponding ANSI 138 classification;

FIG. 23 illustrates a Newtons per millimeter reduction comparison table;

FIG. 24 illustrates a Newtons per millimeter reduction comparison table;

FIG. 26 illustrates a percentage of force reduction comparison table;

FIG. 27 illustrates a percentage of force reduction comparison table; and

DETAILED DESCRIPTION

Figure 1:
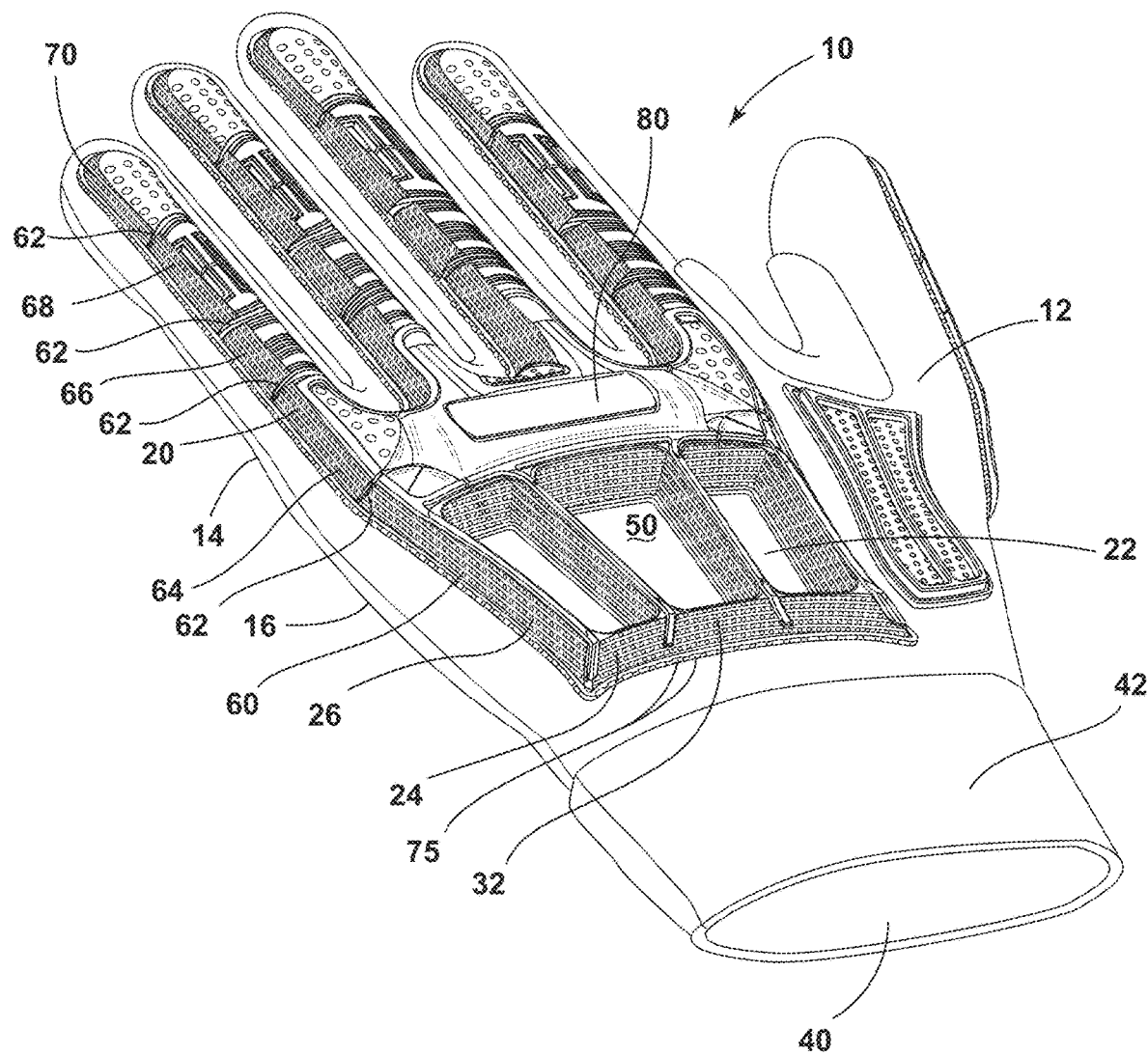
FIG. 1 is a top perspective view of a dorsal side of a protective glove of the present disclosure.

The present illustrated embodiments reside primarily in combinations of method steps and apparatus components related to multi-layer protective fabrics. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," and "dorsal," "lower," and "palmer," "right," "left," "rear," and "distal," "front," and "proximal," "vertical," "horizontal," and derivatives thereof, shall relate to the disclosure as oriented in FIG. 1. Unless stated otherwise, the terms "dorsal" and "posterior" shall refer to the surface of the fabric or glove proximate a backside of a hand, and the terms "palmer" and "anterior" shall refer to the surface of the fabric or glove proximate a palm of the hand. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-28, reference numeral 10 generally designates a protective garment, such as a protective glove, which includes a base layer 12 formed from a material that may be generally breathable, or alternatively generally or partially airtight.

A grip layer 14 is disposed on an anterior side 16 of the base layer 12. The grip layer 14 has an increased coefficient of friction compared to the base layer 12. A protective layer 20 is disposed on a posterior side 22 of the base layer 12. The protective layer 20 includes a three-dimensional matrix 25 that includes a plurality of columns 24. The protective layer 20 also includes a plurality of rows 26 stacked on the plurality of columns 24 and which may extend in a direction orthogonal to the plurality of columns 24. The plurality of rows 26 and the plurality of columns 24 define a plurality of voids 32 that may extend parallel with and orthogonal to the plurality of columns 24.

Figure 2:
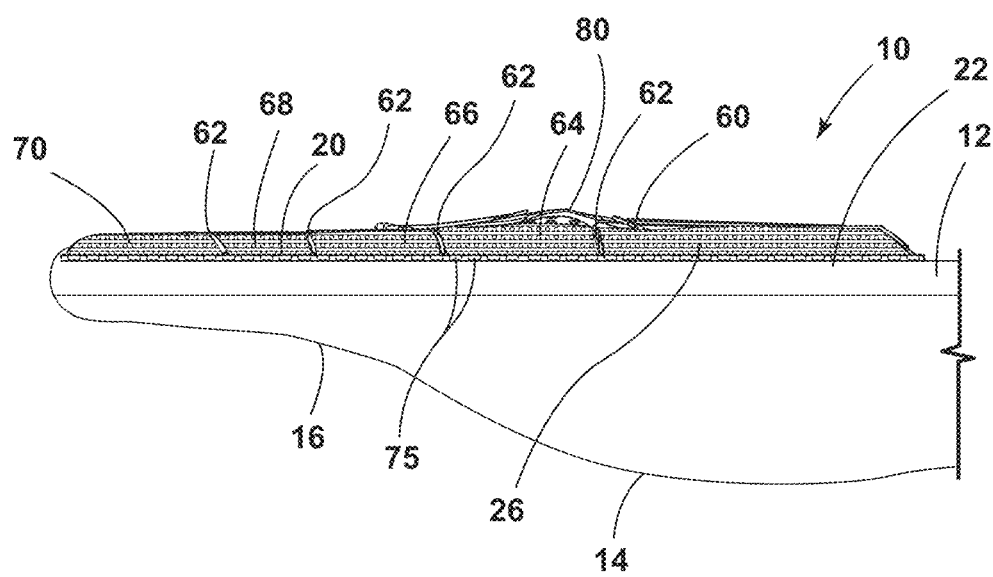
FIG. 2 is a side elevational view of the protective glove of FIG. 1.

With reference again to FIGS. 1 and 2, the protective glove 10 may include an inner liner 40 to provide comfort to a user and which may also have some moisture-wicking capabilities. In addition, the glove 10, as shown in FIGS. 1 and 2, may include a cuff 42 configured to grasp the wrist of the user, thereby preventing the glove 10 from accidentally being removed from a hand of the user. It is generally contemplated that the glove 10 may include multiple layers to provide a generally puncture-resistant and cut-resistant garment that can be used in handling sharp objects or other dangerous materials. The backhand region, or dorsal region 50, of the glove 10 includes the protective layer 20.

Traditionally, protective layers have been injection molded, cast, or dip molded, for example, and applied to the dorsal region 50 of the glove 10. However, it is generally contemplated that these materials may be replaced by printed materials that are disposed on the dorsal region 50 of the glove 10. The printed materials may be printed directly onto the dorsal region 50 of the glove 10, or may be printed elsewhere, possibly in sheets, and then applied via an adhesive or bonding process to the dorsal region 50 of the glove 10. The printed materials provide a number of benefits. As an initial matter, because of the matrix 25 related to the printed materials, a lighter weight can be achieved. In addition, the printed materials allow for breathability and water flow through the protective layer 20 of the glove 10.

Moreover, the materials used to build the protective layer 20, and specifically the matrix 25 of the protective layer 20, also provide increased benefits. For example, hydrophobic and hydrophilic layers can be used to repel or attract water at various parts of the glove 10. Oftentimes these materials cannot be used in traditional protective layer construction methods, such as injection molding.

Various methods of applying the protective layer 20 to the dorsal region 50 of the glove 10 may be utilized. For example, direct fusion of components, including the protective layer 20, to textile, knit, or substrate materials of the glove 10 may be conducted. The protective layer 20 can also be glued on, sewn on, or encapsulated within layers of the textile, knit, or substrate materials. When the encapsulating material is hard, a compressible material (e.g., the protective layer 20 or a separate layer) must contact the hand member to protect a hand of the wearer with the soft, compliant, deformable materials disposed between the encapsulation material and the hand of the wearer. Accordingly, the hard encapsulating material may not be disposed between the protective layer 20 and the hand.

The material that can be used to make the protective layer 20 may include Thermoplastic Polyurethane (TPU), Thermoplastic Rubber (TPR), Thermoplastic Elastomer (TPE), Thermoplastic Copolyester (TPC), Thermoplastic Polyester Elastomer (TPEE), Thermoplastic Elastomer-Polyvinyl Acetate (TPE-PVA), Plasticized Copolyamide Thermoplastic Elastomer (PCTPE), Polymerized Lactic Acid (PLA), Polyethylene Terephthalate Glycol (PETG), Polyethylene Terephthalate (PET), Polyphenyl Ether Polystyrene (PPEPS), Polyethylene Terephthalate Copolyester (PETT), Polyethylene Terephthalate Glycol Amorphous Fluoroplastics (PETG-AF), Acrylonitrile Butadiene Styrene (ABS), Acrylonitrile Butadiene Styrene Conductive Anodic Filament (ABS-CAF), Polypropylene (PP), Polyethylene (PE), High Impact Polystyrene (HIPS), High-Density Polyethylene (HDPE), Polycarbonate (PC), Polycarbonate Acrylonitrile Butadiene Styrene (PC-ABS), Acrylonitrile Butadiene Styrene High Impact Acrylic, Acrylonitrile Styrene Acrylate (ASA) Nylon, Nylon-copolymer, Polyamide, Polyvinyl Acetate (PVA), Amphora, Ultem, acrylates, methacrylates, Carbon Fiber Nylon, Carbon Fiber Polymerized Lactic Acid (CF-PLA), Carbon Fiber Acrylonitrile Butadiene Styrene (CF-ABS), Carbon Fiber Polyethylene Terephthalate Glycol (CF-PETG), CF-ABS monomeric styrene and oligomeric acrylates, Vinyl Esters, Epoxides, Urethanes, Polyethers, Polyester, HIPS-Carbon Fiber and Graphene, Polyetherketoneketone (PEKK), PEKK Carbon Fiber, Polyethylenimine (PEI), Polypropylene (PP) with 30% Glass Fiber Filler (GF30-PP), Polyamide 6 with a 30% Glass Fiber reinforcement (GF30-PA6), Polycarbonate Polytetrafluoroethylene (PC-PFTE), Thermoplastic Chlorinated Polyethylene (CPE HG100), and Surlyn® polyethylene co-polymer.

With further reference to the protective garment 10 as set forth herein, yarns or fibers used to make the base layer 12 may include approximately 96% polyamide (Nylon) and 4% elastic. In other aspects, the base layer 12 may also, or alternatively, include cotton, polyester, elastane, Lycra, polyaramid)(Kevlar®), ultra-high molecular weight polyethylene (UHMWPE, Spectra®, Dyneema®), glass, or other high-performance fibers. Further, alternative embodiments of the base layer 12 may include any combination of cotton fibers, aramid fibers, polyurethane fibers, polyamide fibers, high-density polyethylene fibers, ultra-high molecular weight polyethylene fibers, and glass fibers. Further, combinations of these fibers are also conceivable with steel fibers and/or fiberglass strands.

Unique impact-resistant components can be made by either three-dimensional printing or, in some cases, injection molding. The components all have three-dimensional structures that promote the dissipation of the impact force. Besides the macrostructure, the material choice and the fine fiber deposition are chosen to promote the dissipation of the impact force. Most of the structures shown herein are not easily made without using one of the three-dimensional techniques set forth in this disclosure. These structures have significantly better performance than the equivalent solid Thermoplastic Rubber, Plastisol, etc., and in some instances better than Viscoelastic Foams.

Fused filament fabrication may be utilized to apply the protective layer 20 to the dorsal region 50 of the glove 10. Fused filament fabrication is a three-dimensional printing process that utilizes a continuous filament of thermoplastic material. The filament is fed or drawn through a printer extruder head at a predetermined temperature. Molten thermoplastic material is then forced out of the print nozzle and deposited on the base layer 12. It is generally contemplated that the base layer 12 of the glove 10 will be stationary and that the print head will move relative to the glove 10. However, it is also contemplated that the base layer 12 of the glove 10 may be dynamic and move relative to a stationary print nozzle that dispenses molten thermoplastic material onto the base layer 12 of the glove 10. Regardless, it will be understood that the print nozzle and base layer 12 of the glove 10 move in two dimensions relative to one another to define a predetermined pattern on the base layer 12. Over time, the print nozzle moves vertically away from the glove 10, creating a three-dimensional construction from the molten thermoplastic material. The speed of the print head may be governed by the type of thermoplastic material that is utilized, and the amount of material that is applied to the base layer 12 of the glove 10.

Stereolithography may also be utilized. Stereolithography is also a three-dimensional printing technology which utilizes photopolymerization. Stereolithography is an additive manufacturing process in which an ultraviolet laser is directed toward a photopolymeric resin. The ultraviolet laser is programmed to draw a design or shape onto the surface of the photopolymeric resin. As the ultraviolet light is applied to the photopolymeric resin, the resin is solidified, thereby forming a three-dimensional object. The platform upon which the photopolymeric resin rests is then adjusted vertically so that another layer is applied over the solidified three-dimensional object. Once again, the ultraviolet laser draws a predefined shape at the next layer. This process continues until the three-dimensional object is complete in shape.

Selective laser sintering may also be utilized. Selective laser sintering is also an additive manufacturing process that utilizes a laser to sinter powdered materials together. The powdered materials are frequently polymeric and are configured to bond as the laser automatically points at predefined locations at a particular cross-section of a three-dimensional model. The selective laser sintering may be applied directly to the base layer 12 of the glove 10 or may be applied to a separate sheet and then later bonded to the glove 10 through a secondary manufacturing process.

Each process described herein is configured to assist in applying the components, such as the protective layer 20, to the glove 10 to reduce the amount of force transferred from a kinetic impact to the wearer of the glove 10.

With reference again to FIGS. 1 and 2, the protective layer 20 is constructed using one of the processes noted above and includes the three-dimensional matrix 25 made up of the plurality of columns 24 and the plurality of rows 26 that together define the protective layer 20. Each of the plurality of columns 24 and the plurality of rows 26, as illustrated, have a similar diameter. However, it will be contemplated that the diameter of the plurality of columns 24 and the plurality of rows 26 may have differing diameters and lengths. In addition, the plurality of columns 24 and the plurality of rows 26 define the plurality of voids 32 to allow for flexure of the plurality of columns 24 and the plurality of rows 26 during an impact. The material choice and physical attributes of the three-dimensional matrix 25 directly influence the ability of the protective layer 20 to absorb impact force and minimize perceived force to the wearer.

Figure 3:
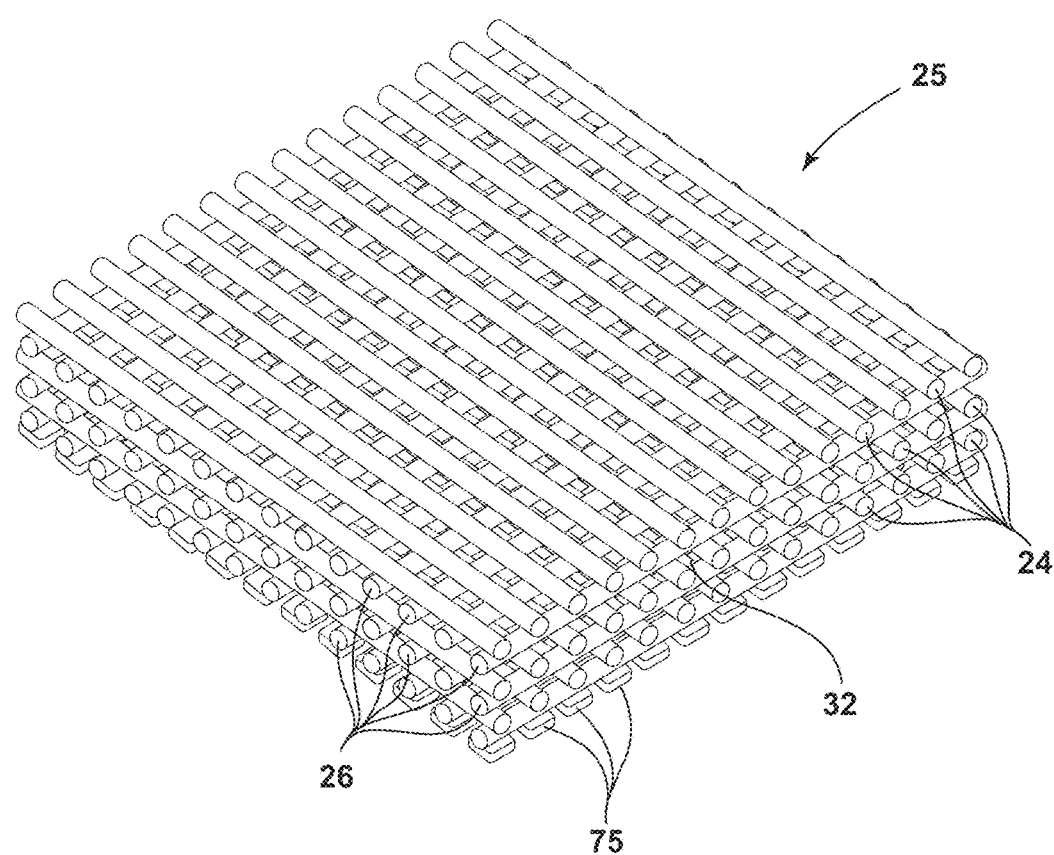
FIG. 3 is a top side perspective view of a three-dimensional matrix of a protective layer of a protective garment, or glove, of the present disclosure.
Figure 4:
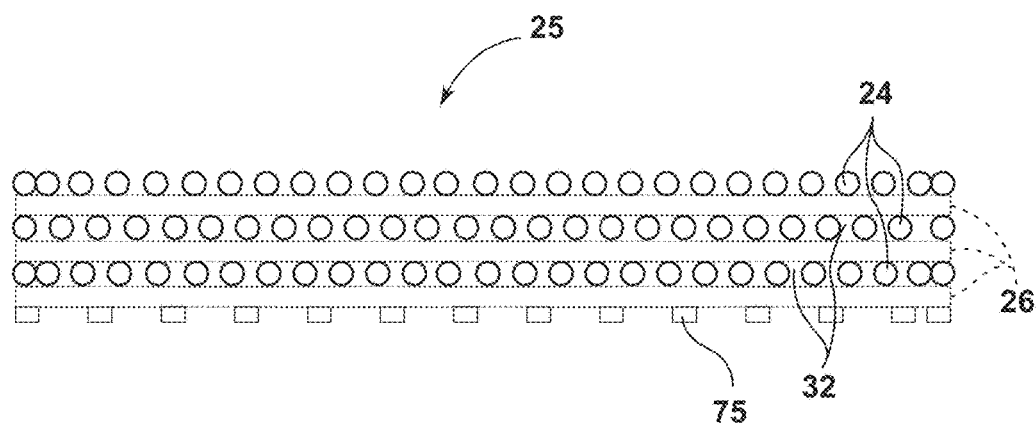
FIG. 4 is a side cross-sectional view of a three-dimensional matrix of a protective layer.
Figure 5:
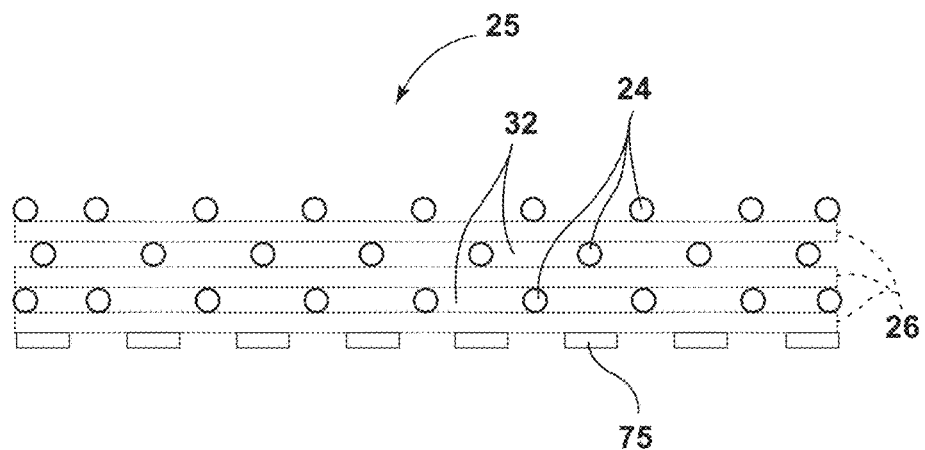
FIG. 5 is a side cross-sectional view of a three-dimensional matrix of a protective layer.

In one example shown in FIGS. 3-5, a simplified version of the three-dimensional matrix 25 is illustrated. It will be understood that the construction of this matrix 25 is exemplary and that other matrices 25 may be developed based on how the garment or glove 10 will be used. As shown in FIG. 3, a multitude of interface members 75 are printed first. Alternatively, the interface members 75 could be printed in a solid sheet and be removed for attachment to the garment or glove 10. The interface members 75 may be printed onto a removable substrate and later attached to the garment or glove 10. Alternatively, the interface members 75 may be printed directly onto the garment or glove 10. After printing the interface member layer, which acts as an intermediary between the fabric of the glove 10 and the protective layer 20, layers of the protective layer 20 are then printed. The layers of the protective layer 20 include the plurality of rows 26 and the plurality of columns 24, which may be aligned orthogonally as shown in FIGS. 3-5, or may be arranged in any other pattern that proves useful to creating a lightweight protective layer. Additionally or alternatively, the plurality of rows 26 may extend in a first direction and the plurality of columns 24 may extend in a second direction. The plurality of columns 24 may not be positioned orthogonally but may be positioned at any other angle that provides the selected protective layer configuration.

As illustrated in FIG. 3, the plurality of rows 26 and the plurality of columns 24 have a uniform cross-section. However, it is contemplated that the cross-section of the columns in the plurality of columns 24 may differ from the cross-section of the rows in the plurality of rows 26. Further, the cross-sections of each of the columns and the rows may differ within the plurality of columns 24 and the plurality of rows 26, respectively. The cross-sections and configurations of the plurality of rows 26 and the plurality of columns 24 may differ depending on the selected protective layer 20. Moreover, the configuration of the plurality of rows 26 and the plurality of columns 24 may define the spacing, size, and shape of the voids 32. The voids 32 may be formed interstitial to the plurality of rows 26 and the plurality of columns 24 within the three-dimensional matrix 25. In examples where the plurality of rows 26 extend orthogonal to the plurality of columns 24, the voids 32 generally extend parallel with, and orthogonal to, the plurality of columns 24. It will also be understood that more or fewer columns and rows may be present in the protective layer 20.

For purposes of this disclosure, the protective layer 20 includes all of the columns and rows that are associated with energy absorption or impact absorption. The different configurations of the matrix 25 are referred to herein as DSPX configurations. As illustrated in FIGS. 3-5, there are three rows and three columns; however, there may be more rows or more columns. It is generally contemplated that each of the plurality of columns 24 and the plurality of rows 26 may be spaced anywhere from 1 mm to 8 mm apart and have a thickness of anywhere from 0.2 mm to 2 mm. It will also be understood that various densities, as shown in FIGS. 4 and 5, of the protective layer 20 may impact the ability to absorb energy and also the ability for the protective layer 20 to drain fluids from the protective layer region. The layer of interface members 75 will be of sufficient thickness to properly bond the protective layer 20 to the underlying base layer 12. It is generally contemplated that the layer of interface members 75 will be anywhere from 0.1 mm to 2 mm thick, depending on the application. Once the protective layer 20 has been completely printed, top layers 80 (FIGS. 1 and 2), which may be aesthetic or functional, may be placed on the printed regions. It is contemplated that the top layer 80 may be adhered to the protective layer 20, or otherwise also printed on the protective layer 20, depending on the application. The top layer 80 is configured to provide an aesthetic appearance, but may also be configured to properly relay (transfer) energy absorption from an external force to the protective layer 20 of the garment or glove 10.

In a specific configuration, referred to herein as a DSPX3 configuration, the matrix 25 may include the plurality of columns 24 and the plurality of rows 26. Each of the plurality of rows 26 and the plurality of columns 24 may be spaced 3 mm apart and may have a thickness of 1.2 mm. Accordingly, each row and each column may have a diameter or thickness of 1.2 mm.

With reference yet again to FIGS. 1-5, the printing method may incorporate breaks as a result of the manner of printing, or as a result of cutting through the protective layer 20. The cutting may be by mechanical means, laser, etc., and is configured to be positioned at a substantial bend point that may be needed on the garment or glove 10. For example, a metacarpal region 60 of the protective layer 20 includes a break 62 between the metacarpal region 60 of the protective layer 20 and a knuckle region 64, proximate the metacarpophalangeal joint (MCJ). In addition, another break 62 is disposed between the knuckle region 64 and a proximal phalanx 66 of each finger. Yet another break 62 is disposed between the proximal phalanx 66 and a middle phalanx 68 of each finger, proximate the proximal interphalangeal joint (PIA and yet another break 62 is disposed between the middle phalanx 68 and a distal phalanx 70 of each finger, proximate the distal interphalangeal joint (DIJ). Accordingly, the protective layer 20 may extend over the metacarpal region 60, a primary region that includes the proximal phalanx 66, the middle phalanx 68, and the distal phalanx 70 of one or more finger areas, a secondary region that includes the proximal phalanx 66 and the distal phalanx 70 of a thumb area, or a combination thereof.

Figure 6:
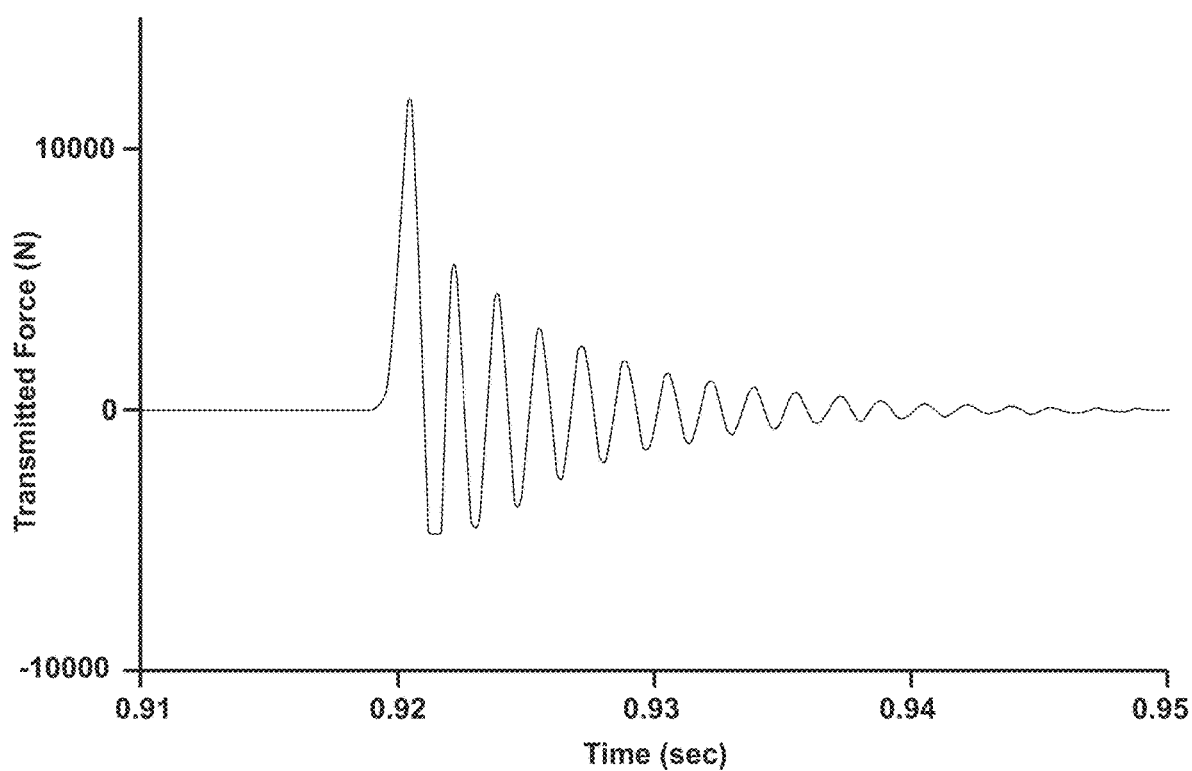
FIG. 6 illustrates a conventional material force graph.

The three-dimensional shapes constructed from the processes disclosed herein provide lighter weight and more breathable garments. These constructions are significantly less dense than PVC, Plastisol, and TPR when compared to the finished product. The embodiments of the present disclosure are designed to provide better metacarpal and phalangeal coverage and can be easily manufactured to fit a broader range of hand sizes. Impact testing based on ISEA 138-2018 has shown that the embodiment of the present disclosure transfers significantly less force to a load cell compared to Plastisol and TPR products. For example, the graph of FIG. 6 illustrates a typical conventional material transmitted force graph. As can be seen, the application of a 5J impact results in stabilizing a 12 kN transmitted peak force. The force increases steeply, then passes zero as the system stabilizes. It is readily observable that as the system stabilizes, the peaks and valleys continue to wane. This generally holds true for most materials for impact resistance, such as Plastisol and foam.

Figure 7:
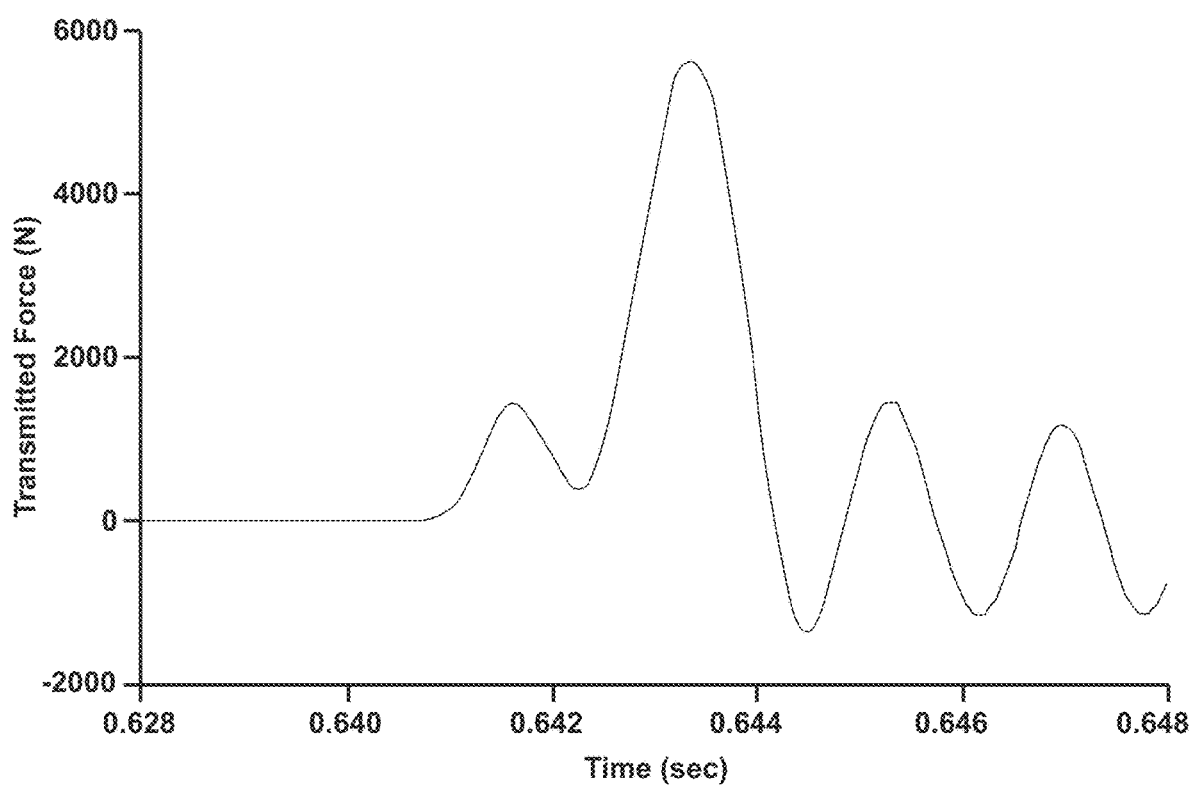
FIG. 7 illustrates a printed material force graph.
Figure 8:
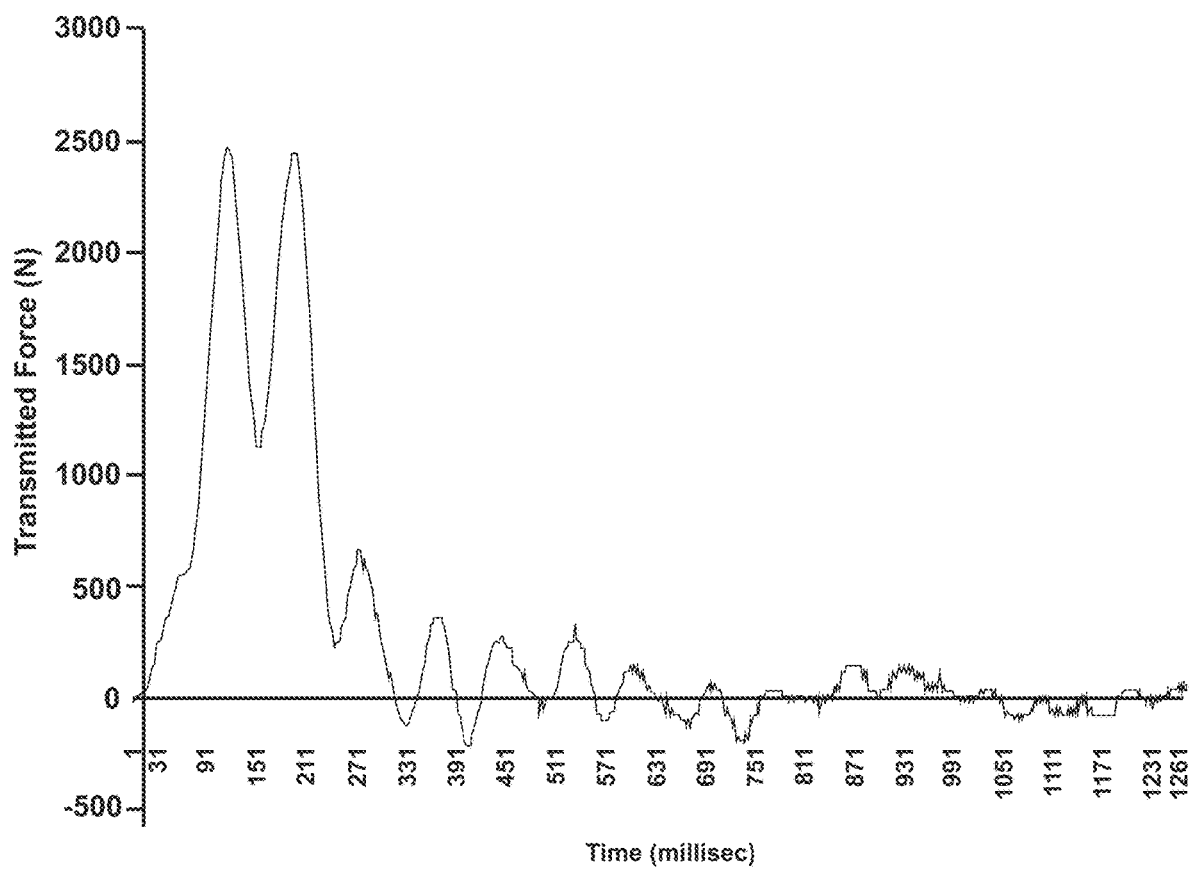
FIG. 8 illustrates another printed material force graph.

With reference now to FIG. 7, an alternate material utilizes the printing process as set forth herein, and a graph illustrates the application of the 5J impact and a transmitted force of approximately 1.5 kN, wherein the graph shows a peak and the subsequent valley, which does not pass zero before peaking again at over 5.5 kN before passing zero at the next valley. Further, as shown in FIG. 8, a similar material includes a transmitted peak force of approximately 2.5 kN, a subsequent valley of nearly 1.2 kN, and then another peak of nearly 2.5 kN once again. A subsequent valley is achieved that is still above the zero line and another peak that exceeds 500 N before passing the zero line. These materials illustrate that the application of the force over a longer period of time, with additional peaks and valleys, can reduce the acceleration, and therefore reduce the force transmitted to the wearer of the impact-resistant glove 10. These properties can be attained by adjusting the size or the spacing of the plurality of rows 26, the plurality of columns 24, the voids 32, and the interface members 75, as well as by adjusting the cross-section of the protective layer 20, as discussed more fully in detail below.

Figure 9A:
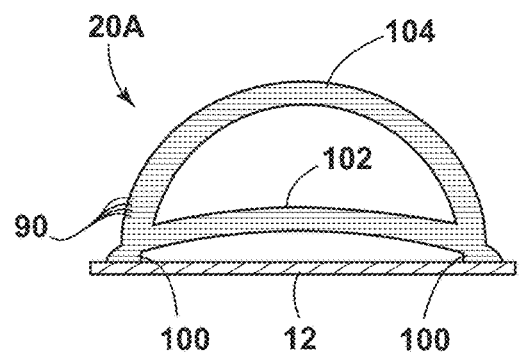
FIG. 9A is a cross-sectional view of a three-dimensional matrix of a protective layer.
Figure 9B:
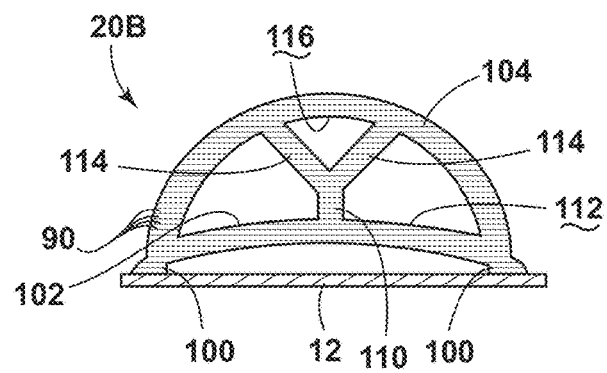
FIG. 9B is a cross-sectional view of a three-dimensional matrix of a protective layer.
Figure 9C:
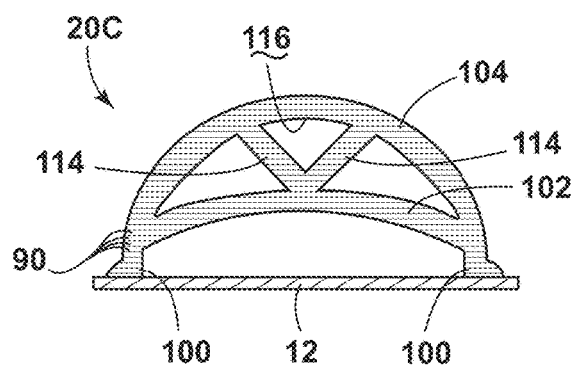
FIG. 9C is a cross-sectional view of a three-dimensional matrix of a protective layer.
Figure 9D:
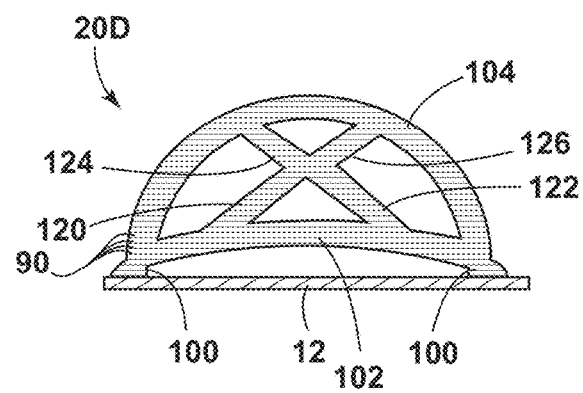
FIG. 9D is a cross-sectional view of a three-dimensional matrix of a protective layer.
Figure 9E:
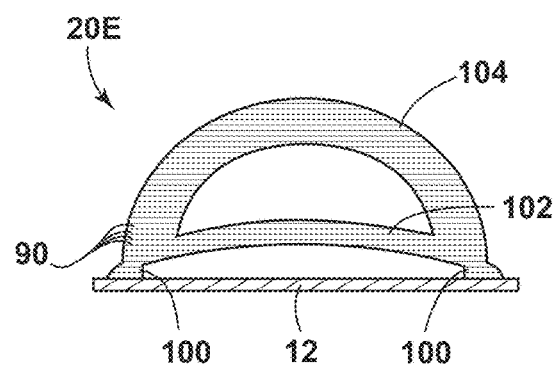
FIG. 9E is a cross-sectional view of a three-dimensional matrix of a protective layer.
Figure 9F:
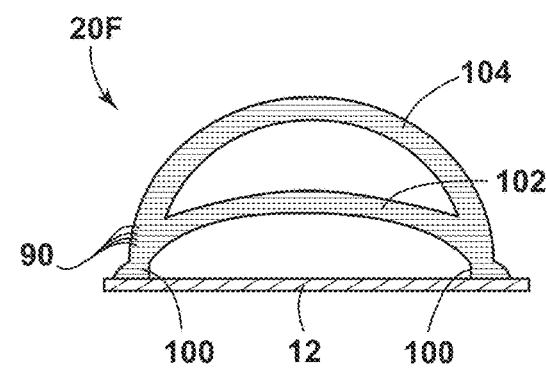
FIG. 9F is a cross-sectional view of a three-dimensional matrix of a protective layer.
Figure 9G:
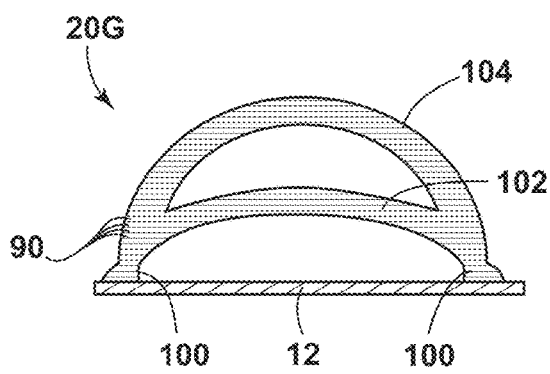
FIG. 9G is a cross-sectional view of a three-dimensional matrix of a protective layer.
Figure 9H:
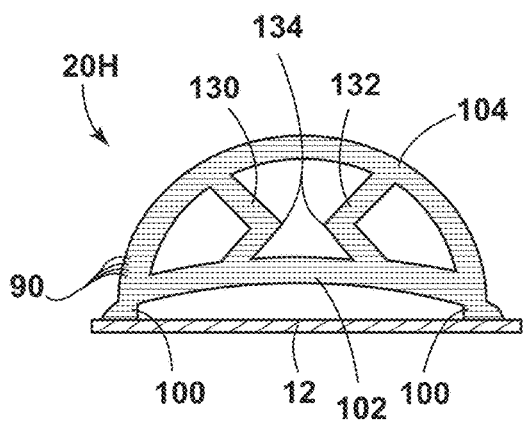
FIG. 9H is a cross-sectional view of a three-dimensional matrix of a protective layer.
Figure 9I:
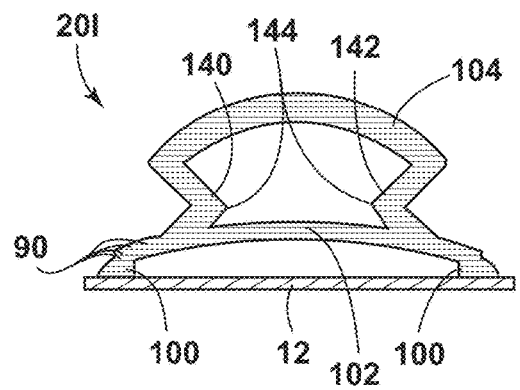
FIG. 9I is a cross-sectional view of a three-dimensional matrix of a protective layer.
Figure 9J:
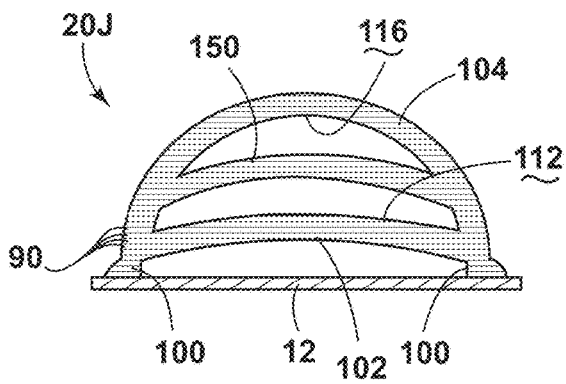
FIG. 9J is a cross-sectional view of a three-dimensional matrix of a protective layer.
Figure 9K:
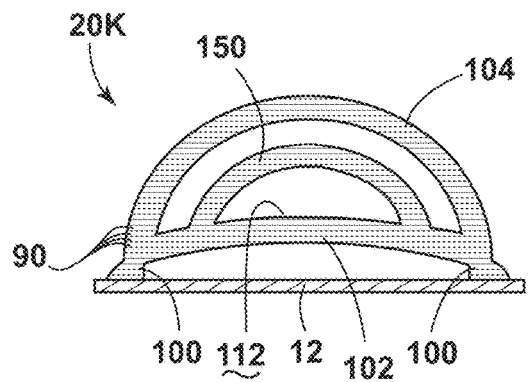
FIG. 9K is a cross-sectional view of a three-dimensional matrix of a protective layer.
Figure 9L:
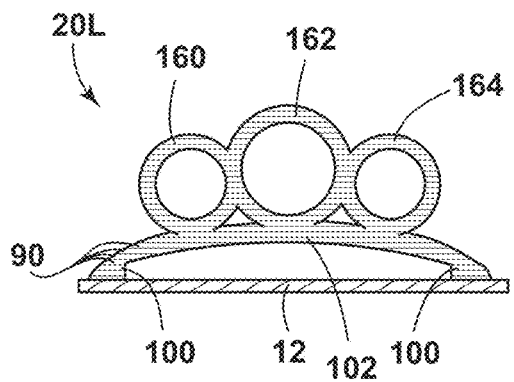
FIG. 9L is a cross-sectional view of a three-dimensional matrix of a protective layer.
Figure 9M:
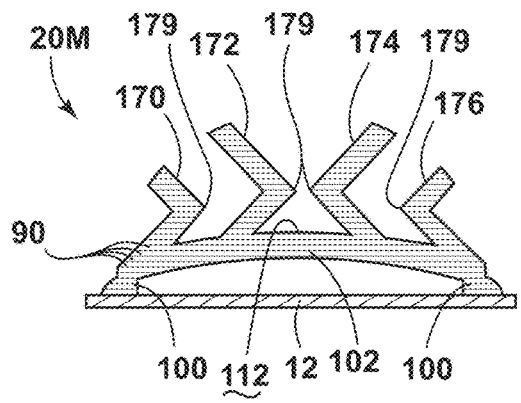
FIG. 9M is a cross-sectional view of a three-dimensional matrix of a protective layer.
Figure 9N:
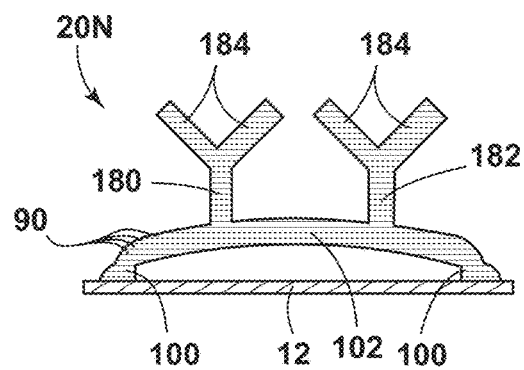
FIG. 9N is a cross-sectional view of a three-dimensional matrix of a protective layer.
Figure 9O:
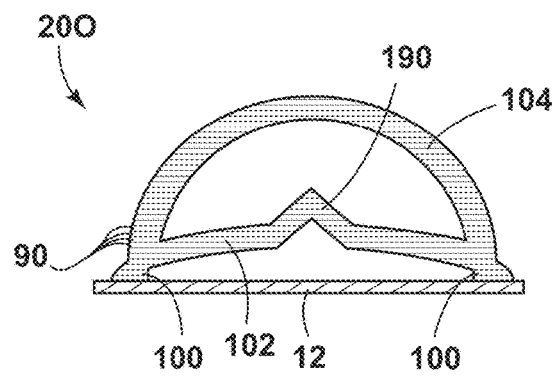
FIG. 9O is a cross-sectional view of a three-dimensional matrix of a protective layer.
Figure 9P:
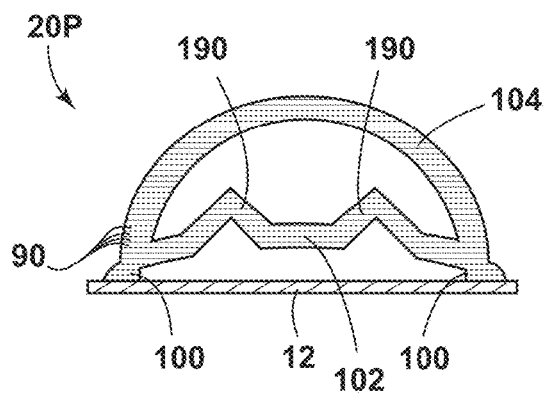
FIG. 9P is a cross-sectional view of a three-dimensional matrix of a protective layer.
Figure 9Q:
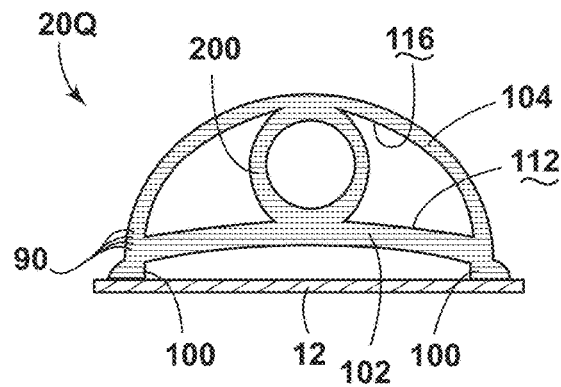
FIG. 9Q is a cross-sectional view of a three-dimensional matrix of a protective layer.
Figure 9R:
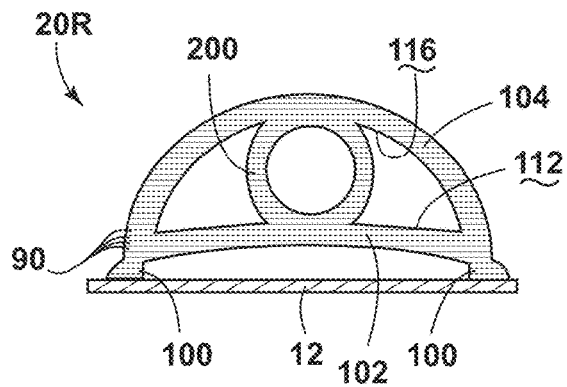
FIG. 9R is a cross-sectional view of a three-dimensional matrix of a protective layer.
Figure 9S:
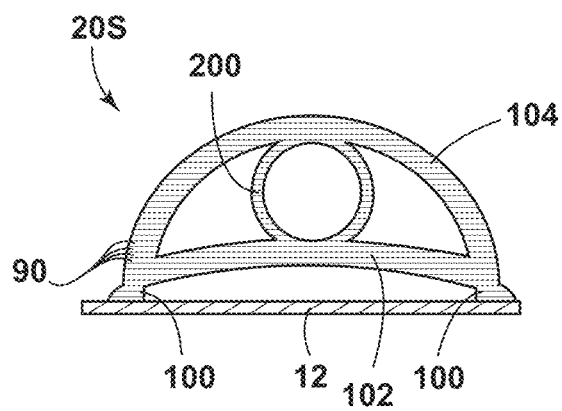
FIG. 9S is a cross-sectional view of a three-dimensional matrix of a protective layer.
Figure 9T:
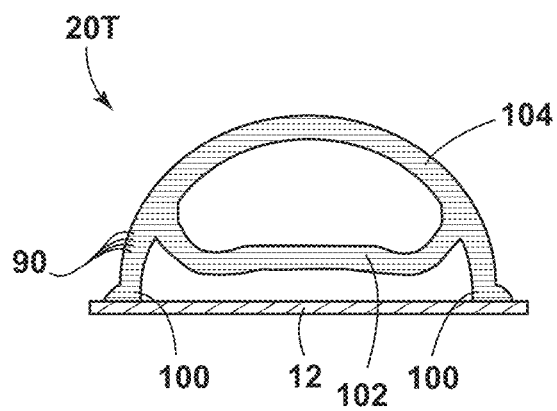
FIG. 9T is a cross-sectional view of a three-dimensional matrix of a protective layer.

With reference now to FIGS. 9A-9T, various cross-sections of protective layers 20A-20T are illustrated. Each of the different cross-sections provides varying flexibility, breathability, impact absorption, etc. It will be understood that other possible configurations may also be used outside those set forth in FIGS. 9A-9T. It will also be understood that like reference numerals will be used for like features in each of the figures. Each protective layer 20A-20T is formed by printing a multitude of print layers 90 upon each other. Additional print layers may extend between the print layers 90 and may extend at any angle relative thereto. Each print layer 90 may include at least one of the plurality of rows 26 and the plurality of columns 24. A first print layer 90 may include the plurality of rows 26 and a second adjacent print layer 90, stacked on the first print layer 90, may include the plurality of columns 24.

With regard to FIG. 9A, a cross-section of a protective layer 20A is illustrated. The cross-section includes feet 100 that are configured to be printed on the base layer 12. The feet 100 may also be attached by other methods including sonic welding, adhesion, etc. A lower wall 102 extends between the feet 100, spaced-apart from the base layer 12, and an upper wall 104 extends above the lower wall 102. The lower wall 102 includes a very mild arcuate construction while the upper wall 104 includes a more aggressive arcuate construction. It will be contemplated that the upper wall 104 will receive and absorb a substantial amount of force during an impact event while the lower wall 102 will act to stabilize the protective layer 20A as a whole.

As illustrated, FIG. 9B includes a similar construction to that set forth in FIG. 9A; however, FIG. 9B also includes internal bracing in the form of a vertical support 110 that extends from and is coupled with an inside surface 112 of the lower wall 102. The vertical support 110 diverges into diagonal supports 114 that are operably coupled with an inside surface 116 of the upper wall 104. With reference now to FIG. 9C, an illustrated protective layer 20C includes a similar construction to FIG. 9B, but does not include the vertical support 110 extending from the inside surface 112 of the lower wall 102. In addition, the lower wall 102 includes a smaller radius of curvature than that shown in FIG. 9B.

With reference now to FIG. 9D, the illustrated cross-section of a protective layer 20D includes a similar configuration for the upper wall 104 and the lower wall 102 but also includes an internal structure with first and second lower diagonal supports 120, 122 that couple with the lower wall 102 and first and second upper diagonal supports 124, 126 that couple with the upper wall 104.

Further, FIG. 9E illustrates another cross-section of protective layer 20E that includes the lower wall 102 and the upper wall 104; however, the upper wall 104 is approximately twice as thick as the upper wall 104 of FIG. 9A. In this instance, there may be less flexure of the protective layer 20E as compared to other cross-sections of various protective layers 20A-20T.

With reference now to FIG. 9F, the illustrated cross-section 20F includes a similar construction to FIG. 9A, but the lower wall 102 includes a small radius of curvature than that shown in FIG. 9A. Indeed, the distance between the lower wall 102 and the base layer 12 is approximately the same as the distance between the lower wall 102 and the upper wall 104. FIG. 9G includes a similar construction to FIG. 9F, but with the lower wall 102 and the upper wall 104 being thicker than the lower wall 102 and the upper wall 104 of FIG. 9F. This construction may be less flexible, but may also be better for withstanding higher impact loads.

Referring now to FIG. 9H, the illustrated embodiment of a protective layer 20H includes internal supports 130, 132, each of which includes an engineered bend or corner 134 at a mid-portion thereof. The internal supports 130, 132 are coupled with and extend between the lower wall 102 and the upper wall 104.

With reference now to FIG. 9I, the upper wall 104 does not extend all the way to the feet 100. Rather, the upper wall 104 terminates at internal supports 140, 142 of a protective layer 20I. The internal supports 140, 142 also include an engineered bend 144.

With reference now to FIG. 9J, the illustrated protective layer 20J includes an intermediate layer 150 that extends between the lower wall 102 and the upper wall 104. As illustrated, the intermediate layer 150 includes first and second ends that are operably coupled with the inside surface 116 of the upper wall 104. FIG. 9K is similar to FIG. 9J, but the intermediate layer 150 connects directly to the inside surface 112 of the lower wall 102 instead of the upper wall 104.

FIG. 9L includes a different construction than those previously addressed. FIG. 9L illustrates a protective layer 20L with the feet 100 supporting the lower wall 102. First, second, and third circular absorption members 160, 162, 164 extend from the lower wall 102 and are configured to absorb impact force when applied to the base layer 12 of the glove 10.

FIG. 9M includes absorption members 170, 172, 174, 176 that extend from the inside surface 112 of the lower wall 102. Each of the absorption members 170, 172, 174, 176 includes an engineered bend or corner 179 at a mid-portion thereof that allows for substantial flexure.

FIG. 9N illustrates a protective layer 20N that includes impact absorption members 180, 182. Each of the impact absorption members 180, 182 includes diagonally extending interface members 184 configured to receive an impact force during use. The interface members 184 extend at approximately a 90° angle relative to one another, but this angle may differ depending on the application.

FIG. 9O illustrates a protective layer 20O having the upper wall 104 that extends down to the feet 100. The lower wall 102 extends across the protective layer 20O between the feet 100 and includes an intermediate fold zone 190 that extends upwardly toward the upper wall 104. The intermediate fold zone 190 may also extend downward away from the upper wall 104. FIG. 9P is a similar construction to that shown in FIG. 9O, but includes multiple of the intermediate fold zone 190 that extend upwardly toward the upper wall 104.

FIG. 9Q illustrates another protective layer 20Q that includes the lower wall 102 and the upper wall 104 spaced-apart from one another and including an intermediate support member 200 that has a circular cross-section disposed therebetween. The lower wall 102 is thicker, nearly twice as thick, as each of the upper wall 104 and the intermediate support member 200. The intermediate support member 200 is operably coupled with the inside surface 116 of the upper wall 104 and the inside surface 112 of the lower wall 102. FIG. 9R illustrates a similar configuration to that illustrated in FIG. 9Q, but with the upper wall 104 and the intermediate support member 200 having a thicker construction. The upper wall 104, the lower wall 102, and the intermediate support member 200 all generally have a similar thickness in the configuration of FIG. 9R. FIG. 9S includes a similar construction to that shown in FIGS. 9Q and 9R, but with the lower wall 102 and the upper wall 104 having a similar thickness and with the intermediate support member 200 having a thinner wall construction.

FIG. 9T illustrates another construction wherein the lower wall 102 is concaved toward the base layer 12 rather than being convex away from the base layer 12, such as shown in FIG. 9A.

For each of the constructions shown in FIGS. 9A-9T, it will be understood that the various configurations will be applied depending on the application. Various temperatures and climates, as well as the medium within which the glove 10 will be used, will influence which protective layer material and protective layer construction will be applied to the dorsal region 50 of the glove 10.

Figure 10:
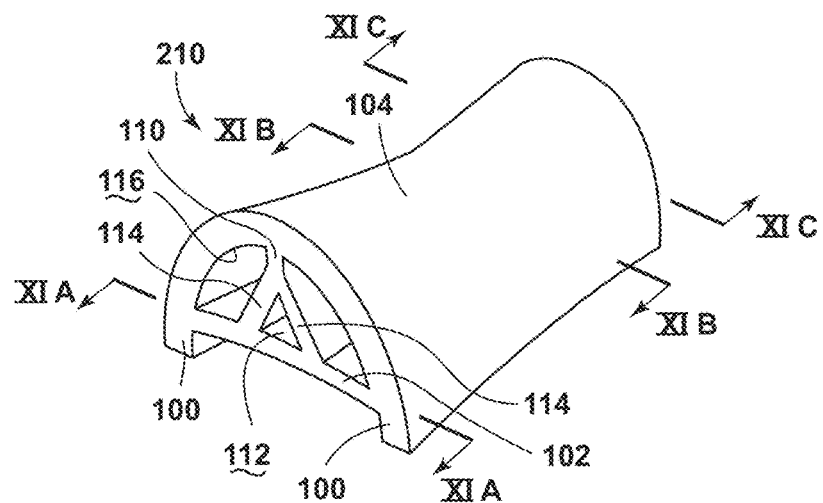
FIG. 10 is a top perspective view of a three-dimensional matrix of a protective layer.
Figure 11A:
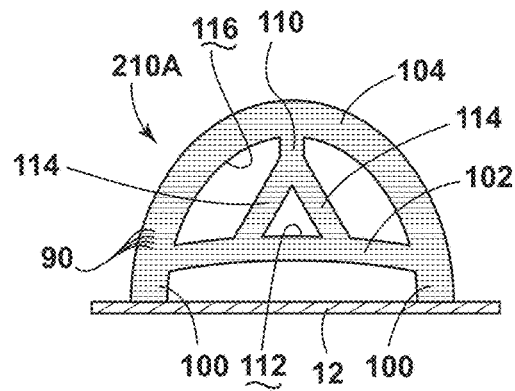
FIG. 11A is a cross-sectional view of a three-dimensional matrix of the protective layer of FIG. 10 taken at line XIA-XIA.
Figure 11B:
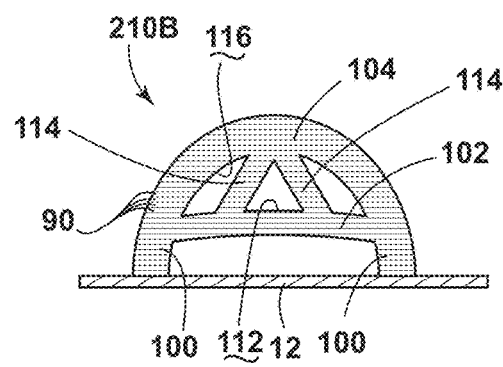
FIG. 11B is a cross-sectional view of a three-dimensional matrix of the protective layer of FIG. 10 taken at line XIB-XIB.
Figure 11C:
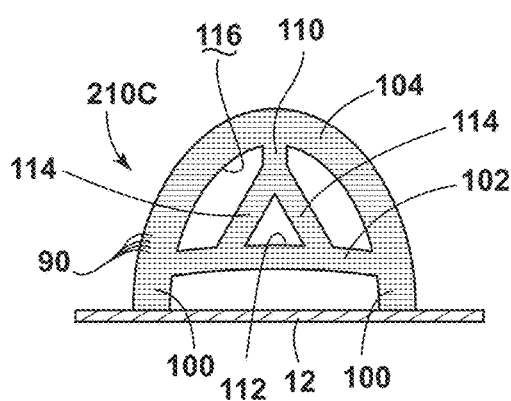
FIG. 11C is a cross-sectional view of a three-dimensional matrix of the protective layer of FIG. 10 taken at line XIC-XIC.
Figure 12:
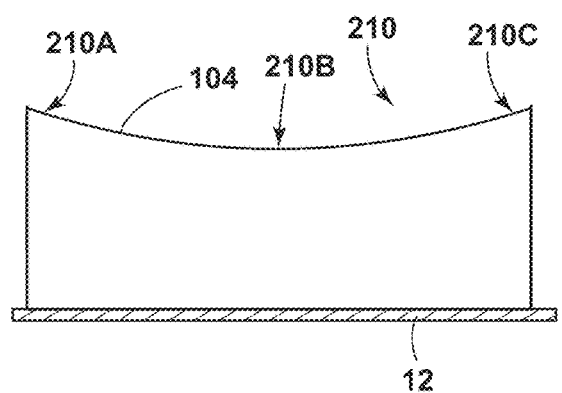
FIG. 12 is a side elevational view of a three-dimensional matrix of the protective layer of FIG. 10.

With reference now to FIGS. 10-12, another construction of a protective layer 210 is illustrated, which is also referred to herein as the KNU7 configuration. It will be understood that other possible configurations may also be used outside those set forth in FIGS. 10-12. It will also be understood that like reference numerals will be used for like features in each of the figures. Each protective layer 210A-210C is formed by printing a multitude of print layers 90 with the selected cross-sectional profile upon each other. Additional print layers may extend between the print layers 90 and may extend at any angle relative thereto. Additionally, each of the various cross-sections illustrated in FIGS. 11A-11C may be included in a single configuration of the protective layer 210, or in separate protective layers 210.

With reference now to FIG. 10, the protective layer 210 includes varying cross-sections to provide for different strength, support, or flexibility along the protective layer 210. Referring to FIG. 11A, a cross-section of the protective layer 210A is illustrated. It is contemplated that the protective layer 210A may be a portion of the overall protective layer 210. The cross-section includes the feet 100 that are configured to be printed on the base layer 12. The feet 100 may also be attached by other methods including sonic welding, adhesion, etc. The lower wall 102 extends between the feet 100, and the upper wall 104 extends above the lower wall 102. The lower wall 102 includes a very mild arcuate construction having a large radius of curvature, while the upper wall 104 includes a more aggressive arcuate construction with a smaller radius of curvature. It will be contemplated that the upper wall 104 will receive and absorb a substantial amount of force during an impact event, while the lower wall 102 will act to stabilize the protective layer 210A as a whole. The protective layer 210A includes the internal bracing in the form of the vertical support 110 that extends from and is coupled with the inside surface 116 of the upper wall 104, which diverges into the diagonal supports 114 that are operably coupled with the inside surface 112 of the lower wall 102.

With reference now to FIG. 11B, an illustrated protective layer 210B includes a similar construction to FIG. 11A, but does not include the vertical support 110 extending from the inside surface 116 of the upper wall 104. It is contemplated that the protective layer 210B may be included as a portion of the overall protective layer 210. In FIG. 11B, the diagonal supports 114 extend between the inside surface 116 of the upper wall 104 and the inside surface 112 of the lower wall 102. The protective layer 210B may be separate from, or integrally formed, with the protective layer 210A.

With reference to FIG. 11C, an illustrated protective layer 210C includes a similar construction to FIG. 11A. The protective layer 210C includes the vertical support 110 extending into the diverging diagonal supports 114 disposed between the lower wall 102 and the upper wall 104. It is contemplated that the protective layer 210C may be included as a portion of the overall protective layer 210. The protective layer 210C may be separate from, or integrally formed, with one or both of the protective layers 210A, 210B.

Referring to FIGS. 10-12, the protective layer 210 generally includes each of the cross-sectional configurations illustrated in FIGS. 11A-11C (e.g., protective layers 210A, 210B, 210C). In various examples, the protective layer 210B may be disposed between the protective layers 210A, 210C, which have the vertical support 110 diverging into the diagonal supports 114. The protective layer 210B may have a height less than a height of the protective layers 210A, 210C. Accordingly, as illustrated in FIG. 12, the upper wall 104 is concaved toward the base layer 12 along a longitudinal extent of the protective layer 210. Additionally or alternatively, the protective layer 210A in FIG. 11A may have a greater width than the protective layer 210B in FIG. 11B, and the protective layer 210B in FIG. 11B may have a greater width than the protective layer 210C in FIG. 11C. Accordingly, as best illustrated in FIG. 10, the protective layer 210 may have a decreasing width from protective layer 210A to protective layer 210C.

For each of the constructions shown in FIGS. 10-12, it will be understood that the various configurations will be applied depending on the application. Various temperatures and climates, as well as the medium within which the glove 10 will be used, will influence which protective layer material and protective layer construction will be applied to the dorsal region 50 of the glove 10. It is also contemplated that the glove 10 may include any combination of the protective layer 20, as illustrated in FIGS. 9A-9T, and the protective layer 210, as illustrated in FIGS. 10-12, depending on the application.

With reference to FIGS. 1-12, the material used for the three-dimensional matrix 25 and shapes disclosed herein may affect the impact absorption, breathability, and weight of the protective garment 10. As discussed herein, examples of the three-dimensional protective layers 20, 210 may include the DSPX configurations, such as the DSPX3 configuration or the KNU7 configuration. The protective layers 20, 210 are formed with three-dimensional printing materials. The three-dimensional matrix 25 and shapes generally include TPU material or any other material or combination of materials disclosed herein. The DSPX3 and KNU7 materials were compared to conventional Plastisol materials. Various tests were conducted, and the data was accumulated and compared as discussed further herein. Such data includes, but is not limited to, density, modulus, percent extension-to-break, Moisture Vapor Transmission Rate (MVTR), and various force absorption and transmittance.

Further, impact testing was conducted following the ANSI/ISEA 138 Impact Testing Standard. Under this standard, a drop sled and striker that have a mass of 2.5 kg were raised to a height, such that it struck a test material at a velocity of 2 m/s with an impact energy of 5J. The test material rests on an anvil coupled to a high-frequency load cell, which records the force transmitted through the anvil with a sampling frequency of 50 kHz. The peak force was reported when the test was performed with no impact-absorbing material, the peak force was approximately 21 kN, which is considered the applied force.

Starting with the density of the test materials, including DSPX3, KNU7, and Plastisol, the density of the DSPX3 and KNU7 are both be less than a density of Plastisol. The density of the protective layers 20, 210, including DSPX3 and KNU7, may be in a range of from approximately 0.30 g/cm$^3$ to approximately 0.80 g/cm$^3$. The density of each of DSPX3 and KNU7 was determined by the mass divided by the calculated volume. For the DSPX3 material, the volume may be measured by multiplying length, width, and height of an exterior boundary. In the sample tested, the DSPX3 had a mass of approximately 7.1 grams and a volume of approximately 18.56 cm$^3$, calculated from exterior boundary measurements of 48 mm, 49 mm, and 7.89 mm. For the KNU7 material, the volume may be determined using CAD software Rhinoceros 5 or other similar software. In the sample tested, the KNU7 had a mass of approximately 1.6 grams and a volume of approximately 2.012 cm$^3$. In various examples, the Plastisol has a density of approximately 1.21 g/cm$^3$. The DSPX3 may have a density of approximately 0.38 g/cm$^3$, which is about 31% as dense as Plastisol. Additionally, KNU7 may have a density of approximately 0.80 g/cm$^3$, which is about 65.7% as dense as Plastisol. Accordingly, both the DSPX3 and KNU7 materials disclosed herein provide for less dense protective layers 20, 210 compared to conventional Plastisol structures.

Further, referring to FIGS. 13 and 14, the mechanical properties of the printed TPU (e.g., the protective layers 20, 210) are improved over conventional Plastisol. For example, modulus testing was performed using an ADMET 7601 Testing Machine. Specimen were printed with the same printing technique used to print the DSPX3 and KNU7 samples. Measurements were taken of each sample prior to testing. Samples of three-dimensional printed TPU and Plastisol were elongated at a rate of 200 mm/mm for fifty seconds. The load was measured with a force transducer measured at a rate of 1000 Hz. With this technique, modulus, percent extension-to-break, energy to break, and break energy per cubic millimeter were calculated. Modulus is the slope of a stress-strain curve for a material (e.g., the slope of the uniaxial stress (force/area) strain ($\Delta L/L$ or proportional deformation) curve). Typically, the initial shape of the slope is considered the modulus. The modulus was measured and determined to be greater for TPU compared to conventional Plastisol. The average modulus for the printed TPU was measured to be approximately 23.2 MPa, and the modulus for Plastisol was measured to be approximately 4.3 MPa. Accordingly, with a greater modulus, the protective layers 20, 210 formed from TPU may have a higher resistance and may deform less under elastic loads compared to Plastisol. The increased modulus may be advantageous for providing superior reduction in transmitted impact force and reducing or minimizing plastic deformation at high and/or repeated impact events.

Additionally, the printed TPU may have a higher percent of extension-to-break compared to Plastisol. A higher extension-to-break demonstrates a higher capability to resist changes of shape and withstand strain without plastic deformation, often expressed as a ratio between changed length and initial length of a material sample. The average percent extension-to-break for three-dimensional printed TPU was determined to be approximately 435%. In comparison, the average percent extension-to-break for the Plastisol sample was approximately 184%. A higher percent of extension-to-break may be advantageous for absorbing force and providing support while minimizing the failure of the impact material.

Further, with reference still to FIGS. 13 and 14, the TPU sample had a higher break energy per cubic millimeter (J/mm$^3$) compared to Plastisol. Break energy per volume is also referred to as toughness and is related to wear performance of a material. The greater the amount of energy a material can absorb before breaking, the higher the resiliency or toughness of the material. The printed TPU had an average break energy per cubic millimeter of approximately $5.9 \times 10^{-2}$ J/mm$^3$, compared to Plastisol which has an average break energy per cubic millimeter of approximately $7.24 \times 10^{-4}$ J/mm$^3$. The toughness or wear of the printed TPU is about 80 times greater than Plastisol. Accordingly, the printed TPU has a greater capacity and ability to absorb energy than Plastisol. Further, the TPU has a greater capacity to absorb energy elastically and a greater ability to absorb energy up to fracture compared to Plastisol. As a result, the printed TPU may be advantageous for increasing force absorbency of the protective garment 10.

Further still, with reference now to FIG. 15, the DSPX3 and KNU7 samples may have an increased Moisture Vapor Transmission Rate (MTVR) compared to Plastisol. The increased MVTR may result from structural changes in the protective layers 20, 210 related to density. The MVTR of the protective layers 20, 210, including DSPX3 and KNU7, may be in a range of from approximately 0.003 mL/cm$^2$/hour to approximately 0.01 mL/cm$^2$/hour. MVTR may be determined by measuring the amount of water in a container over a period of time with a specified material adhered to an opening of the container. During testing, the materials adhered to the container had a consistent surface area, and the containers were placed in front of a fan to provide consistent air velocity. The MTVR may be calculated as the change in weight of the containers over the specified period of time.

For example, the MTVR may be calculated as the average grams of water evaporated per area (cm$^2$) of material per hour. Samples of DSPX3, KNU7, Plastisol, and a control material, each with an area of 17.35 cm$^2$, were tested over a 48 hour period. Based on multiple tests, the Plastisol material had an average MTVR of $9.7 \times 10^{-6}$ mL/cm$^2$/hour. Accordingly, Plastisol had almost no moisture transmission. In comparison, DSPX3 had an average MTVR of approximately $1.14 \times 10^{-2}$ mL/cm$^2$/hour, which is more than 700 times greater than the Plastisol material. Further, KNU7 has an average MTVR of approximately $3.1 \times 10^{-3}$ mL/cm$^2$/hour, which is more than 200 times greater than Plastisol. Accordingly, the protective layers 20, 210 (e.g., DSPX3 and KNU7) may allow for greater water evaporation, and as a result, greater breathability of the protective garment 10 compared to conventional Plastisol materials.

As stated previously, each protective layer 20, 210 may have any practicable thickness. The protective layers 20, 210 may have a thickness in a range of from about 3.1 mm to about 19.2 mm. In a specific example, the protective layers 20, 210 have a thickness of about 6.8 mm. The thickness relates to weight, flexibility, and MVTR of the protective layers 20, 210. When the density of the protective layers 20, 210 is in the range of from approximately 0.30 g/cm$^3$ to approximately 0.80 g/cm$^3$, the thickness of the respective protective layer 20, 210 may affect the MVTR. For example, when each protective layer 20, 210 has a thickness of about 3.1 mm, the MVTR is approximately 0.025 mL/cm$^2$/hour. In another example, when each protective layer 20, 210 has a thickness of about 19.8 mm, the MVTR is approximately 0.004 mL/cm$^2$/hour. In an additional example, when each protective layer 20, 210 has a thickness of about 6.8 mm, the MVTR is approximately 0.011 mL/cm$^2$/hour. The glove 10, with an increased MVTR, has increased moisture-wicking capabilities and breathability compared to a convention glove with Plastisol.

Figure 16:
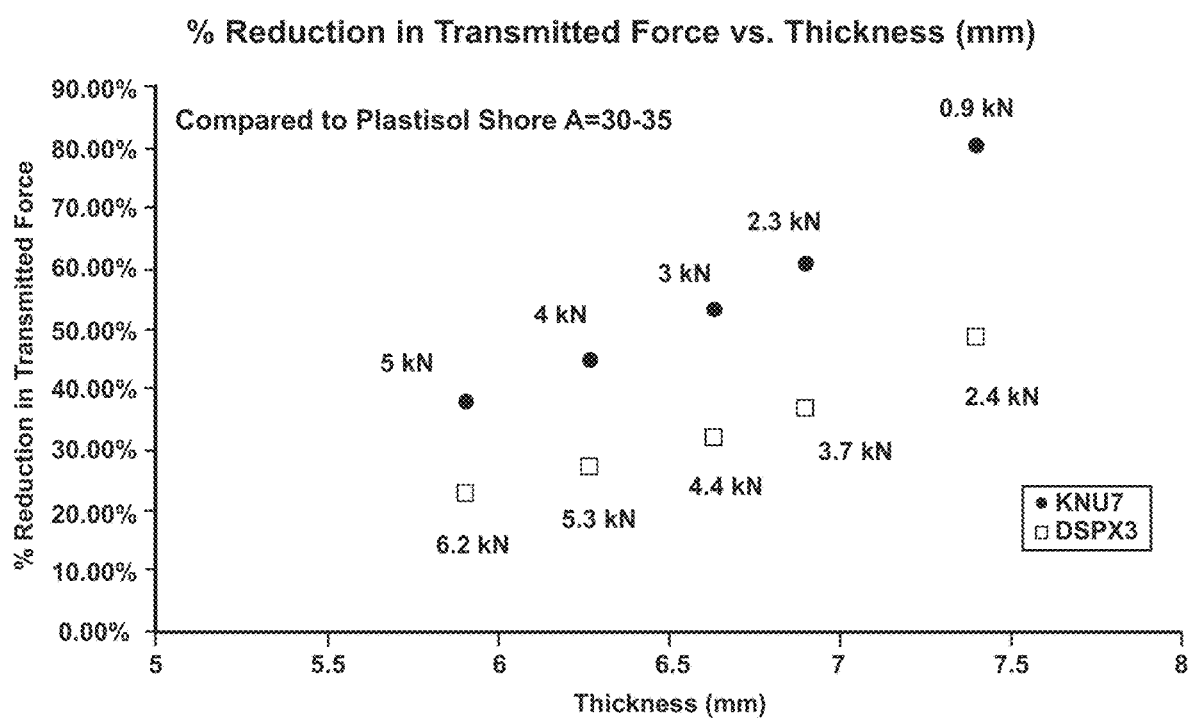
FIG. 16 illustrates a percent reduction in transmitted force graph.

With reference now to FIGS. 16-18, DSPX3 and KNU7 materials transfer less force to the anvil and load cell during impact testing based on ISEA 138-2018 compared to conventional Plastisol and TPR products. For example, as illustrated in the graph of FIG. 16, DSPX3 and KNU7 significantly reduce transmitted force compared to Shore A Plastisol. As further illustrated, KNU7 may produce a greater reduction of the transmission of force relative to DSPX3 and compared to Plastisol materials. Additionally, the reduction in force transmitted by the DSPX3 and KNU7 is cumulative. Accordingly, the thicker the DSPX3 or KNU7 material on the protective garment 10 (e.g., the thicker the protective layer or the protective layer 210), the greater the reduction of transmitted force. Accordingly, the thicker the DSPX3 or KNU7 material or structure, the greater the impact protection is on the protective garment 10.

With reference to FIGS. 16, 17, and 19-21, pursuant to the ANSI/ISEA 138 standard, protective gear, such as the protective garment 10, is classified into performance levels (Performance Levels 1-3) based on impact resistance. The greater the impact resistance of the protective gear, the higher the performance classification. The performance classification ranges from Performance Level 1, which has the lowest impact resistance, to Performance Level 3, which has the highest impact resistance. DSPX3 and KNU7 materials may increase the performance level of the protective garment 10 compared to Plastisol.

For example, as illustrated in FIGS. 18 and 20, a Plastisol impact structure with a thickness of about 5.9 mm transmits approximately 8.5 kN of force, as detected by the anvil and the load cell in the impact testing. In comparison, KNU7 with a thickness of about 5.9 mm, may transmit approximately 5 kN of force. Accordingly, the KNU7 material that is about 5.9 mm thick reduces the transmitted force by about 40% compared to Plastisol. Further, in such an example, the Plastisol impact structure is classified as a Performance Level 1, and the KNU7 is classified as a Performance Level 2. In another example, a Plastisol impact structure with a thickness of about 6.6 mm transmits approximately 7 kN of force. In comparison, KNU7 with a thickness of about 6.6 mm may transmit approximately 3 kN of force, which is a reduction of about 57% in transmitted force. Further, according to the ANSI-ISEA 138 standard, in such an example, the Plastisol impact structure is classified as a Performance Level 1, whereas the KNU7 is classified as a Performance Level 3. Accordingly, the KNU7 allows for greater impact performance, as well as flexibility.

In a DSPX3 example, as illustrated in FIG. 21, a Plastisol impact structure with a thickness of about 6.8 mm may transmit approximately 6.7 kN of force. In comparison, DSPX3 with a thickness of about 6.8 mm transmits approximately 3.1 kN of force, which is reduced by a factor of about 2.2 compared to Plastisol. In such an example, the Plastisol impact structure is classified as a Performance Level 1, whereas the DSPX3 is classified as a Performance Level 3. Accordingly, the DSPX3 allows for greater impact performance, as well as flexibility.

Figure 22:
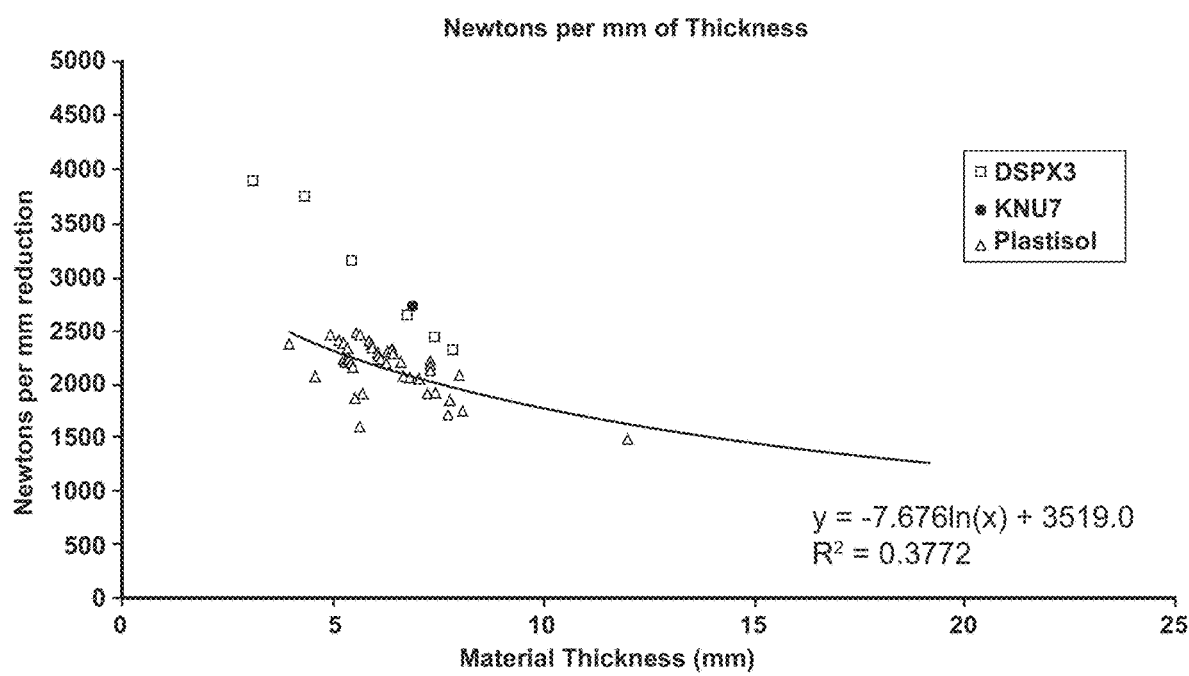
FIG. 22 illustrates a reduction in force graph.

With reference to FIGS. 22-24, the relationship between the force transferred by DSPX3 and KNU7 and the thickness of the DSPX3 and KNU7 materials, respectively, compared to conventional Plastisol material is illustrated. Based on the ANSI/ISEA 138 Standard, an applied force of 21 kN was applied to the DSPX3, KNU7, and Plastisol. The force transferred by the test material (e.g., DSPX3, KNU7, and Plastisol) was subtracted from the applied force (e.g., 21 kN), and the resulting value was divided by the thickness of the test material to produce the Newtons per millimeter reduction of the test materials. This calculation may be utilized to produce a normalized absorbed force that allows for a comparison of performance samples that vary in thickness. As illustrated in the graph of FIG. 22, the DSPX3 and KNU7 have greater Newtons per millimeter reductions relative to material thickness compared to Plastisol. Accordingly, DSPX3 and KNU7 may achieve a higher force reduction per millimeter with lower material thickness. Therefore, DSPX3 and KNU7 materials may allow for lighter protective garments 10 with higher force reduction per millimeter of material compared to Plastisol protective gear.

Figure 25:
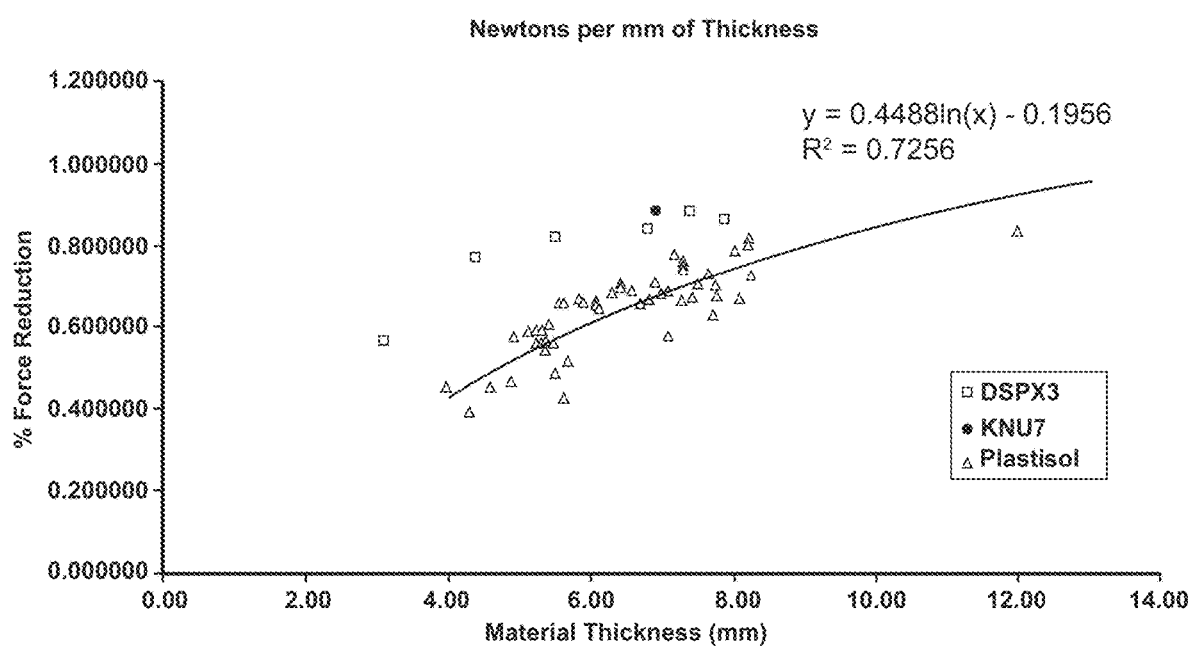
FIG. 25 illustrates a percent reduction in force graph.

With reference to FIGS. 25-27, the relationship between the percent of force reduction by the test materials (e.g., DSPX3, KNU7, and Plastisol) and the thickness of the test material is illustrated. The percentage of force reduction was calculated by subtracting the force transferred by the test material to the load cell from the applied force (e.g., 21 kN) and dividing the resulting value by the applied force. This calculation resulted in the percentage of force absorbed, which is illustrated in FIG. 25 as the percentage of force reduction and compared to the material thickness. As illustrated, DSPX3 and KNU7 displayed a greater percentage of force reduction relative to material thickness than conventional Plastisol.

As best illustrated in FIG. 26, KNU7 that has a thickness of about 6.89 mm displays a percentage of force reduction of approximately 89%, whereas Plastisol of the same thickness displays a percentage of force reduction of approximately 67%. As best illustrated in FIGS. 25 and 27, the percentage of force reduction is cumulative. The thicker the DSPX3 material, the greater the percentage of force reduction. For example, DSPX3 that has a thickness of about 3.07 mm displays a percentage of force reduction of approximately 56.8%, and DSPX3 that has a thickness of about 7.87 mm displays a percentage of force reduction of approximately 86.3%. In another example, DSPX3 with a thickness of about 19.2 mm displays a percentage of reduction of force of approximately 90%. In comparison, Plastisol with a thickness of about 3.07 mm displays a percentage of force reduction of approximately 30.9%, and Plastisol that has a thickness of about 7.87 mm displays a percentage of force reduction of approximately 73%. Accordingly, each protective layer 20, 210 may display a percentage of force reduction in a range of from approximately 55% to approximately 90% over a range of thickness of at least about 3 mm to about 8 mm. In a specific example, each protective layer 20, 210 may display a percentage of force reduction of approximately 85%, which may correspond with a thickness of about 6.8 mm. Moreover, as illustrated in FIGS. 22-27, the DSPX3 and KNU7 materials have greater impact absorbency with a lower material thickness compared to Plastisol materials.

Figure 28:
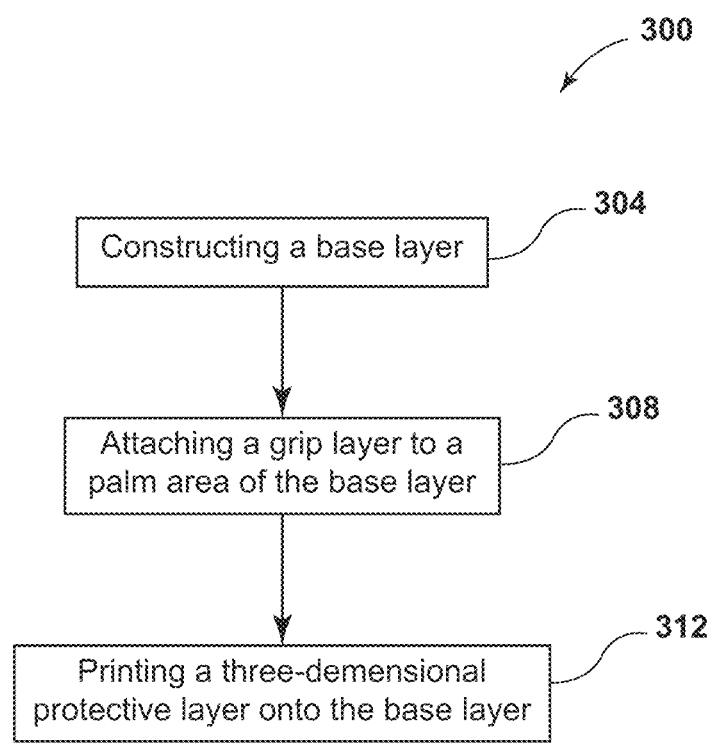
FIG. 28 is a flow diagram of a method of making a protective garment.

With reference to FIG. 28, and further reference to FIGS. 1-27, a method 300 of making or manufacturing the protective garment 10, such as the glove, includes step 304 of constructing the base layer 12. The base layer 12 may be generally breathable, or alternatively generally or partially airtight. The base layer 12 may include flexible materials. In step 308, a grip layer 14 is attached on the anterior side 16 (e.g., a palm area) of the base layer 12. The grip layer 14 may also be attached to the anterior side 16 of a finger area of the base layer 12. The grip layer 14 has an increased coefficient of friction compared to the base layer 12.

In step 312, at least one of the protective layers 20, 210 (e.g., three-dimensional or 3D material) is printed on the posterior side 22 of the base layer 12. As previously described, the printing may be conducted with an additive manufacturing process, such as, for example, fused filament fabrication, stereolithography, selective laser sintering, or a combination thereof. Step 312 may also include tuning the performance or properties of the protective layers 20, 210 through the selected additive manufacturing process. The protective layers 20, 210 may be tuned in all three dimensions to change properties, which may be changed by location on the glove 10. Each protective layer 20, 210 is internally homogenous, which may be advantageous for adjusting the selected properties. Each protective layer 20, 210 may include the three-dimensional matrix 25 and may be printed onto a dorsal region 50 of the base layer 12. Each protective layer 20, 210 may include the DSPX3 materials, KNU7 materials, or a combination thereof as discussed herein.

Additionally or alternatively, step 312 may include printing a first pattern onto the base layer 12 and printing a second pattern onto the first pattern. The second pattern may be different from the first pattern. Each of the first pattern and the second pattern may form different print layers 90. In various examples, the first pattern may include the plurality of rows 26, and the second pattern may include the plurality of columns 24, which may be aligned orthogonally. However, it is contemplated the first and second patterns may be the same or may be arranged in any other pattern that proves useful to creating a lightweight protective layer 20, 210. The print layers 90 may be based on the selected cross-sectional shape of the protective layers 20, 210.

Step 312 may be accomplished in a variety of ways. For example, at least one of the protective layers 20, 210 may be printed directly onto the posterior side 22 of the glove 10. The glove 10 may be stretched on a former. The 3D material and structure (e.g., at least one of the protective layers 20, 210) may be printed in selected locations on the base layer 12. It is contemplated that the former may be moved to directly print additional materials in other locations on the glove 10.

In another example, the 3D material may be printed and then subsequently adhered to the glove 10. The protective layer 20 or the protective layer 210 may be printed onto a carrier. The 3D material may be removed from the carrier and adhered to the glove 10, which may be stretched on a former.

In an additional example, the 3D material may be printed and then subsequently sewn onto the glove 10. In such examples, the 3D material and structure may be printed onto the carrier. The carrier may then be sewn onto the glove 10.

In yet another example of step 312, the 3D material may be printed and then subsequently sewn onto the glove 10. The 3D material and structure may be printed onto the carrier. An additional material, which is different than the 3D material, may then be printed onto the carrier. The carrier may then be sewn onto the glove 10. Any of the exemplary aspects of step 312 may be used independently or in combination to manufacture the glove 10. At least one of the protective layers 20, 210 may be disposed on selected locations of the glove 10 to provide impact-resistance. The protective layer 20 or the protective layer 210 may extend over the metacarpal region 60, a primary region including the proximal phalanx 66, the middle phalanx 68, and the distal phalanx 70 of one or more fingers, a secondary region including the proximal phalanx 66 and the distal phalanx 70 of the thumb, or a combination thereof. It will be understood that the steps of the method 300 may be performed in any order, simultaneously, and/or omitted without departing from the teachings provided herein.

Use of the present device may provide for a variety of advantages. For example, the protective garment 10 may be constructed to be breathable and/or water-repellant. Additionally, the protective layers 20, 210 are significantly less dense than conventional PVC, Plastisol, and TPR structures. Further, the protective layers 20, 210 may provide increased metacarpal and phalangeal coverage. The protective garment 10 may be manufactured to fit a broad range of hand sizes with the protective layer 20, 210 providing increased coverage. Moreover, the protective layers 20, 210 transfer significantly less force to a load cell compared to Plastisol and TPR products. Accordingly, the protective garment 10 with at least one of the protective layers 20, 210 reduces the force transferred from a kinetic impact to the wearer of the glove 10. The percentage of reduction of force may be approximately 85%. Also, the improvement in the reduction of transmitted force is cumulative, so that the thicker the protective layers 20, 210, the greater the effect. Additionally, the protective layers 20, 210 have improved density, modulus, toughness, and MVTR compared to Plastisol products.

Further, the 3D structure of the protective layers 20, 210 may vary based on any one or more of the following aspects: the thickness of the matrix 25, the composition of the materials of the matrix 25, the 3D orientation of the materials of the matrix 25, the number of rows and columns in the matrix 25 per unit volume, or a combination thereof. Each of these aspects may be adjusted using method 300 disclosed herein. The additive manufacturing processes of method 300 may allow for tuning of performance of the protective layers 20, 210 by location in all three dimensions to vary selected properties. Moreover, each of the protective layers 20, 210 may be internally homogenous, which may be advantageous for adjusting properties of the protective layers 20, 210 by location on the glove 10. Additional benefits and advantages may be realized and/or achieved.

The device disclosed herein is further summarized in the following paragraphs and is further characterized by combinations of any and all of the various aspects described therein.

According to one aspect of the present disclosure, a protective garment includes a base layer formed from a flexible material. A grip layer is disposed on a first side of the base layer. The grip layer has an increased coefficient of friction compared to the base layer. A protective layer is disposed on a second side of the base layer. The protective layer includes a three-dimensional matrix that has a plurality of columns that extend in a first direction and a plurality of rows stacked on the plurality of columns that extend in a second direction. The plurality of rows and the plurality of columns define a plurality of voids.

According to another aspect, a three-dimensional matrix defines feet coupled to a base layer. A lower wall extends between the feet and an upper wall extends over the lower wall.

According to yet another aspect, a protective layer is constructed of Thermoplastic Polyurethane.

According to still another aspect, a protective layer has a density of less than 1 g/cm$^3$.

According to another aspect, a protective layer has a moisture vapor transmission rate in a range of from 0.003 mL/cm$^2$/hour to 0.01 mL/cm$^2$/hour.

According to yet another aspect, a protective layer is configured to reduce transmitted force by a range of from 56% to 90%.

According to another aspect of the present disclosure, a protective glove includes a base layer formed from a flexible material. The base layer has a palmer side and a dorsal side. A grip layer is disposed on the palmer side of the base layer. The grip layer has an increased coefficient of friction compared to the base layer. A protective layer is disposed on the dorsal side of the base layer. The protective layer defines a three-dimensional matrix that includes a plurality of print layers.

According to yet another aspect, each print layer includes at least one of a plurality of columns and a plurality of rows. Each of the plurality of rows and the plurality of columns are spaced 3 mm apart and have a thickness of 1.2 mm.

According to still another aspect, a plurality of print layers defines feet coupled to a base layer and at least one wall that extends between the feet and is spaced-apart from the base layer.

According to another aspect, at least one wall includes a lower wall and an upper wall that extends over the lower wall.

According to yet another aspect, a plurality of print layers defines a support that extends between a lower wall and an upper wall.

According to still another aspect, a plurality of print layers defines an absorption member that extends from a surface of the at least one wall.

According to another aspect, a protective layer extends over a metacarpal region of a protective glove.

According to yet another aspect, a protective layer extends over a primary region proximate a proximal phalanx region, middle phalanx region, and distal phalanx region of at least one finger area of a protective glove.

According to yet another aspect, a protective layer is disposed over a secondary region proximate a proximal phalanx region and distal phalanx region of a thumb area of a protective glove.

According to still another aspect, a protective layer has a thickness in a range of from 3 mm to 19.5 mm and a density in a range of from 0.30 g/cm$^3$ to 0.80 g/cm$^3$.

According to another aspect of the present disclosure, a method of manufacturing a protective glove includes constructing a base layer of a flexible material. A grip layer is attached to a palm area of the base layer. A three-dimensional protective layer is printed for a dorsal region of the base layer. The step of printing includes printing a first pattern onto the base layer and printing a second pattern onto the first pattern where the second pattern differs from the first pattern.

According to yet another aspect, a step of printing a three-dimensional protective layer includes printing the three-dimensional protective layer directly onto a base layer at selected locations.

According to still another aspect, a three-dimensional protective layer is removed from a carrier. The three-dimensional protective layer is adhered to a dorsal region of a base layer.

According to another aspect, a three-dimensional protective layer is tuned in all three dimensions to produce selected properties.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A protective garment, comprising:
 a base layer formed from a flexible material;

a grip layer disposed on a first side of the base layer, the grip layer having an increased coefficient of friction compared to the base layer; and a protective layer disposed on a second side of the base layer, the protective layer comprising a three-dimensional matrix including:
a plurality of columns extending in a first direction; and
a plurality of rows stacked on the plurality of columns and extending in a second direction, wherein the plurality of rows and the plurality of columns define a plurality of voids.

2. The protective garment of claim 1, wherein the three-dimensional matrix defines feet coupled to the base layer, a lower wall extending between the feet, and an upper wall extending over the lower wall.

3. The protective garment of claim 1, wherein the protective layer is constructed of Thermoplastic Polyurethane.

4. The protective garment of claim 1, wherein the protective layer has a density of less than 1 g/cm$^3$.

5. The protective garment of claim 1, wherein the protective layer has a moisture vapor transmission rate in a range of from 0.003 mL/cm$^2$/hour to 0.01 mL/cm$^2$/hour.

6. The protective garment of claim 1, wherein the protective layer is configured to reduce transmitted force by approximately 56% to 90%.

7. A protective glove, comprising:
a base layer formed from a flexible material, the base layer having an anterior side and a posterior side;
a grip layer disposed on the anterior side of the base layer, the grip layer having an increased coefficient of friction compared to the base layer; and
a protective layer disposed on the posterior side of the base layer, the protective layer defining a three-dimensional matrix including a plurality of print layers, wherein the plurality of print layers defines feet coupled to the base layer and at least one wall extending between the feet and spaced-apart from the base layer.

8. The protective glove of claim 7, wherein each of the plurality print layers includes at least one of a plurality of columns and a plurality of rows, and wherein each of the plurality of rows and the plurality of columns are spaced 3 mm apart and have a thickness of 1.2 mm.

9. The protective glove of claim 7, wherein the at least one wall includes a lower wall and an upper wall extending over the lower wall.

10. The protective glove of claim 9, wherein the plurality of print layers defines a support extending between the lower wall and the upper wall.

11. The protective glove of claim 7, wherein the plurality of print layers defines an absorption member extending from a surface of the at least one wall.

12. The protective glove of claim 7, wherein the protective layer extends over a metacarpal region of said protective glove.

13. The protective glove of claim 7, wherein the protective layer extends over a primary region proximate a proximal phalanx region, middle phalanx region, and distal phalanx region of at least one finger area of said protective glove.

14. The protective glove of claim 13, wherein the protective layer is disposed over a secondary region proximate a proximal phalanx region and distal phalanx region of a thumb area of said protective glove.

15. The protective glove of claim 7, wherein the protective layer has a thickness in a range of from 3 mm to 19.5 mm and a density in a range of from 0.30 g/cm$^3$ to 0.80 g/cm$^3$.

16. A method of manufacturing a protective glove, comprising:
constructing a base layer of a flexible material;
attaching a grip layer to a palm area of the base layer; and
printing a three-dimensional protective layer for a dorsal region of the base layer, the printing comprising:
printing a first pattern onto the base layer; and
printing a second pattern onto the first pattern, wherein the second pattern is different from the first pattern.

17. The method of claim 16, wherein the step of printing the three-dimensional protective layer includes:
printing the three-dimensional protective layer directly onto the base layer at selected locations.

18. The method of claim 16, further comprising:
removing the three-dimensional protective layer from a carrier; and
adhering the three-dimensional protective layer to the dorsal region of the base layer.

19. The method of claim 16, further comprising:
tuning the three-dimensional protective layer in all three dimensions to produce selected properties.

* * * * *